United States Patent
Kubota et al.

(10) Patent No.: US 8,567,793 B2
(45) Date of Patent: Oct. 29, 2013

(54) SPHERICAL ANNULAR SEAL MEMBER AND METHOD OF MANUFACTURING THE SAME

(75) Inventors: Shuichi Kubota, Kanagawa (JP); Koichi Ishida, Kanagawa (JP); Satoshii Matsunaga, Oita (JP); Eiji Satou, Oita (JP)

(73) Assignee: Oiles Corporation, Tokyo (JP)

( * ) Notice: Subject to any disclaimer, the term of this patent is extended or adjusted under 35 U.S.C. 154(b) by 773 days.

(21) Appl. No.: 12/808,226

(22) PCT Filed: Dec. 15, 2008

(86) PCT No.: PCT/JP2008/003775
§ 371 (c)(1),
(2), (4) Date: Jun. 15, 2010

(87) PCT Pub. No.: WO2009/078165
PCT Pub. Date: Jun. 25, 2009

(65) Prior Publication Data
US 2010/0270754 A1    Oct. 28, 2010

(30) Foreign Application Priority Data
Dec. 17, 2007   (JP) ................................. 2007-325328

(51) Int. Cl.
*F16J 15/32*    (2006.01)
(52) U.S. Cl.
USPC .......................................... 277/627; 277/650
(58) Field of Classification Search
USPC ................... 277/611, 627, 650–654
See application file for complete search history.

(56) References Cited

U.S. PATENT DOCUMENTS 7,063,330 B2 *   6/2006   Kubota et al. ................. 277/627
(Continued)

FOREIGN PATENT DOCUMENTS

| JP | 54-76759 | 6/1979 |
|---|---|---|
| JP | 58-034230 | 2/1983 |

(Continued)

OTHER PUBLICATIONS

International Search Report for PCT/JP2008/003775, mailed Mar. 3, 2009.

(Continued)

*Primary Examiner* — Gilbert Lee
(74) *Attorney, Agent, or Firm* — Nixon & Vanderhye, PC

(57) ABSTRACT

A spherical annular seal member 39 includes a spherical annular base member 37 defined by a cylindrical inner surface 33, a partially convex spherical surface 34, and an annular end faces 35 and 36; and an outer layer 38 formed integrally on the partially convex spherical surface 34 of the spherical annular base member 37. The spherical annular base member 37 includes a reinforcing member 5 made from a metal wire net and a heat-resistant material 6 filling meshes of the metal wire net of the reinforcing member 5 and formed integrally with the reinforcing member 5 in mixed form. The outer layer 38 includes a base layer 46 and a sliding layer 40 constituted of a lubricating composition and adherently formed integrally on the base layer 46 at an outer layer intermediate surface 42, the base layer 46 including a reinforcing member 15 made from a metal wire net and compressed and a heat-resistant material 14 filling meshes of the metal wire net of the reinforcing member 15 and closely press bonded to the reinforcing member 15, the base layer 46 being formed integrally with the partially convex spherical surface 34.

21 Claims, 13 Drawing Sheets

(56) References Cited

U.S. PATENT DOCUMENTS

| | | | |
|---|---|---|---|
| 7,413,195 B2 * | 8/2008 | Kubota et al. | 277/650 |
| 7,717,435 B2 * | 5/2010 | Kubota et al. | 277/650 |
| 2004/0066007 A1 | 4/2004 | Kubota et al. | |
| 2006/0091616 A1 * | 5/2006 | Kubota et al. | 277/627 |
| 2007/0257443 A1 * | 11/2007 | Kubota et al. | 277/404 |
| 2010/0253011 A1 * | 10/2010 | Maeda et al. | 277/626 |

FOREIGN PATENT DOCUMENTS

| JP | 2-215916 | 8/1990 |
|---|---|---|
| JP | 02-215916 A | 8/1990 |
| JP | 06-123362 | 5/1994 |
| JP | 2001-99325 | 4/2001 |
| JP | 2001-099325 A | 4/2001 |
| JP | 2003-97713 | 4/2003 |
| JP | 2003-097713 A | 4/2003 |
| JP | A-2004-044735 | 2/2004 |
| JP | A-2004-301261 | 10/2004 |
| JP | A-2006-322601 | 11/2006 |

OTHER PUBLICATIONS

International Search Report in PCT/JP2008/003775 dated Mar. 3, 2009.

Extended European Search Report issued in European Application No. 08861908.5 dated Jun. 18, 2013.

* cited by examiner

SPHERICAL ANNULAR SEAL MEMBER AND METHOD OF MANUFACTURING THE SAME

This application is the U.S. national phase of International Application No. PCT/JP2008/003775, filed 15 Dec. 2008, which designated the U.S. and claims priority to Japanese Patent Application No. 2007-325328, filed 17 Dec. 2007, the entire contents of each of which are hereby incorporated by reference.

TECHNICAL FIELD

The present invention relates to a spherical annular seal member used in a spherical pipe joint for an automobile exhaust pipe, as well as a method of manufacturing the same.

BACKGROUND ART

[Patent document 1] JP-A-54-76759
[Patent document 2] JP-A-58-34230
[Patent document 3] JP-A-06-123362

In motor vehicles in recent years, an exhaust system incorporating an exhaust emission control device such as a catalyzer is adopted to purify exhaust gases emitted from the vehicle. As in an exhaust system of a transverse engine of a rear exhaust type shown in FIG. 34, exhaust gases from the automobile engine are generally led to an exhaust manifold 500 and are released from a tail pipe 505 into the atmosphere through a catalytic converter 501, an exhaust pipe 502, a prechamber 503, and a silencer 504. The exhaust emission control device in the above-described exhaust system is a heavy object. For this reason, since the exhaust emission control device constitutes the mass of a vibrating system and can be a factor causing the problem of noise and the like, to absorb the vibrations of this exhaust system, means are adopted by disposing a flexible joint, for instance, a spherical pipe joint at a required portion of the exhaust system so as to absorb the vibrations.

DISCLOSURE OF THE INVENTION

Problems that the Invention is to Solve

The seal member used in the spherical pipe joint described in the patent document 1 has advantages in that it is heat resistant, excels in affinity with a mating member, and its impact strength is remarkably improved. However, the seal member has a drawback in that it often generates abnormal frictional noise when it undergoes sliding friction under dry frictional conditions.

As seal members for overcoming the drawback of the seal member described in the above-described patent document 1, the present applicant proposed seal members described in patent document 2 and patent document 3. As shown in FIGS. 35 and 36, each of these seal members 600 is comprised of a spherical annular base member 605 defined by a cylindrical inner surface 601, a partially convex spherical surface 602, and large- and small-diameter-side annular end faces 603 and 604 of the partially convex spherical surface 602, as well as an outer layer 606 formed integrally on the partially convex spherical surface 602 of the spherical annular base member 605. The spherical annular base member 605 includes a reinforcing member 607 made from a metal wire net and a heat-resistant material 608 containing expanded graphite, filling meshes of the metal wire net of the reinforcing member 607, and compressed in such a manner as to be formed integrally with the reinforcing member 607 in mixed form. In the outer layer 606, a lubricant 609 and a heat-resistant material 610 as well as a reinforcing member 611 made from a metal wire net are compressed such that the lubricant 609 and the heat-resistant material 610 are filled in meshes of the metal wire net of the reinforcing member 611, and the lubricant 609 and the heat-resistant material 610 as well as the reinforcing member 611 are integrally formed in mixed form. An outer surface 612 of the outer layer 606 is formed into a smooth surface in which a surface 613 constituted of the reinforcing member 611 and a surface 614 constituted of the lubricant 609 are present in mixed form.

Since the outer surface 612 of the outer layer 606 of the above-described seal member 600 is formed into a smooth surface in which the surface 613 constituted of the reinforcing member 611 and the surface 614 constituted of the lubricant 609 are present in mixed form, it is possible to ensure smooth sliding with a concave spherical portion of the exhaust pipe, i.e., the mating member which is in sliding contact with the outer surface 612. In addition, in the sliding friction between the outer surface 612 and the concave spherical portion, the transfer of the lubricant 609 from the outer surface 612 onto the surface of the concave spherical portion is effected to form on the concave spherical portion a lubricating film constituted of the lubricant 609. Meanwhile, even if the transfer of the lubricant 609 onto the concave spherical portion is effected in excess, the reinforcing member 611 exposed on the outer surface 612 in a scattered manner demonstrates scraping action while leaving an appropriate amount of the lubricating film. Hence, in the sliding friction with the mating member, a shift takes place to sliding friction with the lubricating film formed on the surface of the mating member, so that there is an advantage in that abnormal frictional noise is not generated.

The seal members described in the patent document 2 and the patent document 3 have the above-described advantages. However, in a case where infinitesimal swinging motions and excessive inputs in the axial direction are applied as loads to these seal members continuously for a prolonged time, there is a possibility that the reinforcing member made from the metal wire net exposed on the surface of the outer layer of the seal member attacks the surface of the mating member and induces abrasive wear, thereby damaging and coarsening the surface of the mating member and causing a noticeable decline in sealability. Furthermore, in conjunction with the shift to the abrasive wear, a shift takes place to friction via abrasion powder deposited on the frictional surfaces between the seal member and the mating member, possibly inducing the generation of abnormal frictional noise.

By focusing attention on the outer layer of the seal member constituting the surface of frictional sliding with the mating member, the present inventors discovered organic relationships between the heat-resistant material and the reinforcing member, including the proportion of exposure of the reinforcing member made from the metal wire net in the outer layer of the seal member, the degree of adherence between the reinforcing member and the heat-resistant material constituted of expanded graphite, and the wire diameter of the fine metal wire for forming the metal wire net of the reinforcing member. The present inventors obtained knowledge that the above-described problems can be overcome by improving these relationships.

The present invention has been devised on the basis of the above-described knowledge, and its object is to provide a spherical annular seal member which is capable of preventing as much as possible the damaging and coarsening of the surface of the mating member in the sliding friction with the mating member, and of preventing as much as possible the decline in sealability and the generation of abnormal frictional noise, as well as a method of manufacturing the same.

Means for Solving the Problems

A spherical annular seal member for use in an exhaust pipe joint in accordance with the present invention comprising: a spherical annular base member defined by a cylindrical inner surface, a partially convex spherical surface, and large- and small-diameter-side annular end faces of the partially convex spherical surface; and an outer layer formed integrally on the partially convex spherical surface of the spherical annular base member, wherein the spherical annular base member includes a reinforcing member made from a metal, wire net and a heat-resistant material containing expanded graphite, filling meshes of the metal wire net of the reinforcing member, and compressed in such a manner as to be formed integrally with the reinforcing member in mixed form, and wherein the outer layer includes a base layer and a sliding layer constituted of a lubricating composition and adherently formed integrally on the base layer at an outer layer intermediate surface, the base layer including another reinforcing member made from a metal wire net and compressed and another heat-resistant material containing another expanded graphite, filling meshes of the metal wire net of the another reinforcing member, compressed so as to be closely press bonded to the another reinforcing member, and forming the outer layer intermediate surface together with a surface of the another reinforcing member, the base layer being formed integrally with the partially convex spherical surface, the surface of the another reinforcing member in the outer layer intermediate surface being present in a scattered manner with an area ratio of 5 to 35% with respect an entire surface of the outer layer intermediate surface, an obverse surface of the outer layer exposed to an outside being constituted of a smooth surface of the sliding layer.

According to the spherical annular seal member of the invention, the surface of the other reinforcing member in the outer layer intermediate surface of the base layer is present in a scattered manner with an area ratio of 5 to 35% with respect the entire surface of the outer layer intermediate surface, a sliding layer constituted of a lubricating composition is adherently formed integrally on the outer layer intermediate surface, and the obverse surface of the outer layer exposed to the outside is constituted of a smooth surface of the sliding layer. Therefore, in the friction with the mating member, it is possible to avoid only the other reinforcing member of the outer layer from locally rubbing against the surface of the mating member. As a result, it is possible to prevent the damaging and coarsening of the surface of the mating member as much as possible due to friction, so that it is possible to prevent a decline in sealability. In addition, by virtue of the action of scraping an excess lubricating film formed on the surface of the mating member, the friction is made via the lubricating film of an appropriate thickness formed on the surface of the mating member. Hence, it is possible to prevent the generation of abnormal frictional noise as much as possible.

In the spherical annular seal member in accordance with the invention, the heat-resistant materials of the spherical annular base member and the outer layer contain expanded graphite and at least one of 0.05 to 5.00 wt. % of phosphorus pentoxide as an oxidation inhibitor and 1.0 to 16.0 wt. % of a phosphate as an oxidation inhibitor.

The heat-resistant materials which contain expanded graphite and at least one of phosphorus pentoxide as an oxidation inhibitor and a phosphate as an oxidation inhibitor are capable of improving the heat resistance and oxidation loss resistance of the spherical annular seal member itself, and permit the use of the spherical annular seal member over extended periods of time at 500° C. or in a high-temperature range exceeding 500° C.

In the spherical annular seal member in accordance with the invention, the metal wire nets of the reinforcing members of the spherical annular base member and the outer layer are made from woven metal wire nets and braided metal wire nets obtained by, for instance, weaving or knitting fine metal wires. As for the fine metal wires for forming the woven metal wire net and the braided metal wire net, fine metal wires whose wire diameters are in the range of 0.15 to 0.32 mm, more specifically fine metal wires whose wire diameters are 0.15, 0.175, 0.28, and 0.32 mm, are suitable. In addition, as the metal wire nets of the reinforcing members of the spherical annular base member and the outer layer, woven metal wire nets and braided metal wire nets made from fine metal wires of the same wire diameter may be used. Alternatively, as the metal wire net of the reinforcing member for the spherical annular base member, a woven metal wire net and a braided metal wire net made from a fine metal wire having a wire diameter of the upper limit side of the aforementioned range, i.e., 0.28 to 0.32 mm, may be used, while, as the metal wire net of the reinforcing member for an outer layer, a woven metal wire net or a braided metal wire net made from a fine metal wire having a wire diameter of the lower limit side of the aforementioned range, i.e., 0.15 to 0.175 mm, may be used.

In the spherical annular seal member in accordance with the invention, the lubricating composition of the sliding layer formed on the outer layer intermediate surface in a preferred example is constituted of a simple substance of a polytetrafluoroethylene resin or contains a polytetrafluoroethylene resin. In another preferred example, the lubricating composition contains 70 to 85 wt. % of hexagonal boron nitride, 0.1 to 10 wt. % of boron oxide, and 5 to 20 wt. % of hydrated alumina. In a more preferred example, in the lubricating composition containing 70 to 85 wt. % of hexagonal boron nitride, 0.1 to 10 wt. % of boron oxide, and 5 to 20 wt. % of hydrated alumina, not more than 300 parts by weight or not more than 200 parts by weight, preferably 50 to 200 parts by weight or 50 to 150 parts by weight, of the polytetrafluoroethylene resin is contained with respect to 100 parts by weight of the lubricating composition. Such a lubricating composition may be selected by being appropriately selected in accordance with the intended use.

The sliding layer constituted of such a lubricating composition forms a smooth surface as the sliding surface of the spherical annular seal member, and such a flat surface makes it possible to effect smooth sliding without generating abnormal frictional noise in the sliding with the mating member.

The hydrated alumina in the above lubricating composition in a preferred example is selected from alumina monohydrate such as boehmite or diaspore, alumina trihydrate such as gibbsite or bayerite, and pseudoboehmite.

A method of manufacturing a spherical annular seal member in accordance with the invention, which is used in an exhaust pipe joint and includes a spherical annular base member defined by a cylindrical inner surface, a partially convex spherical surface, and large- and small-diameter-side annular end faces of the partially convex spherical surface, and an outer layer formed integrally on the partially convex spherical surface of the spherical annular base member, comprises the steps of: (a) preparing a heat-resistant material for the spherical annular base member constituted of an expanded graphite sheet with a density of $\alpha$ Mg/m$^3$; (b) preparing a reinforcing member for the spherical annular base member made from a metal wire net obtained by weaving or knitting fine metal wires, superposing the reinforcing member for the spherical annular base member on the heat-resistant material for the spherical annular base member to form a superposed assembly, and convoluting the superposed assembly into a cylindrical form, so as to form a tubular base member; (c) inserting a heat-resistant material for the outer layer constituted of an expanded graphite sheet with a density of $0.3\alpha$ to $0.6\alpha$ Mg/m$^3$ into two layers of a reinforcing member for the outer layer made from a metal wire net obtained by weaving or knitting fine metal wires, and pressurizing in a thicknesswise direction of the heat-resistant material the reinforcing member for the outer layer with the heat-resistant material for the outer layer inserted therein, to cause the heat-resistant material for the outer layer and the reinforcing member for the outer layer to be press bonded to each other such that the heat-resistant material for the outer layer is densely filled in meshes of the metal wire net of the reinforcing member for the outer layer, and the reinforcing member for the outer layer is embedded in the heat-resistant material for the outer layer, thereby forming a flat composite sheet member in which a surface of the heat-resistant material for the outer layer and the reinforcing member for the outer layer are made flush with each other, and the reinforcing member for the outer layer in a surface of the reinforcing member for the outer layer and the surface of the heat-resistant material for the outer layer is exposed in a scattered manner with an area ratio of 5 to 35%; (d) coating a surface of the composite sheet member where the surface of the heat-resistant material for the outer layer and the surface of the reinforcing member for the outer layer are made flush with each other with a lubricating composition so as to form an outer layer forming member in which a coating layer of the lubricating composition is formed on that surface; (e) winding the outer layer forming member around an outer peripheral surface of the tubular base member with the coating layer placed on an outer side, so as to form a cylindrical preform; and (f) fitting the cylindrical preform over an outer peripheral surface of a core of a die, placing the core into the die, and compression-forming the cylindrical preform in the die in an axial direction of the core, wherein the spherical annular base member is formed such that the heat-resistant material for the spherical annular base member constituted of expanded graphite and the reinforcing member for the spherical annular base member made from the metal wire net are compressed and intertwined with each other so as to be provided with structural integrity, and wherein the outer layer includes a base layer and a sliding layer constituted of a lubricating composition and adherently formed integrally on the base layer at an outer layer intermediate surface, the base layer including the reinforcing member for the outer layer made from the metal wire net and compressed and the heat-resistant material for the outer layer constituted of expanded graphite, filling meshes of the metal wire net of the reinforcing member for the outer layer, compressed so as to be closely press bonded to the reinforcing member for the outer layer, and forming an outer layer intermediate surface together with the surface of the reinforcing member for the outer layer, the base layer being formed integrally with the partially convex spherical surface, the surface of the reinforcing member for the outer layer in the outer layer intermediate surface being present in a scattered manner with an area ratio of 5 to 35% in the outer layer intermediate surface, an obverse surface of the outer layer exposed to an outside being constituted of a smooth surface of the sliding layer.

According to the method of manufacturing a spherical annular seal member in accordance with the invention, the heat-resistant material for the outer layer constituted of expanded graphite sheet having a lower density than the density of the expanded graphite sheet forming the heat-resistant material for the spherical annular base member is inserted into two layers of the reinforcing member for the outer layer made from the metal wire net, and the reinforcing member for the outer layer with such a heat-resistant material for the outer layer inserted therein is pressurized in the thicknesswise direction of the heat-resistant material and is thereby press bonded to each other, such that the heat-resistant material for the outer layer is densely filled in the meshes of the metal wire net of the reinforcing member for the outer layer, and the reinforcing member for the outer layer is embedded in the heat-resistant material for the outer layer. It is thereby possible to form a flat composite sheet member in which the surface of the heat-resistant material for the outer layer and the surface of the reinforcing member for the outer layer are made flush with each other, and the reinforcing member for the outer layer in the surface of the reinforcing member of that outer layer and the surface of the heat-resistant sheet member for the outer layer, which are made flush with each other, is exposed in a scattered manner with an area ratio of 5 to 35%.

In the outer layer formed by this composite sheet member, even in the case where the composite sheet member is integrally formed with the partially convex spherical surface of the spherical annular base member, the reinforcing member is present in a scattered manner in its outer layer intermediate surface with the area ratio of 5 to 35%. Therefore, in the friction with the mating member, it is possible to avoid only the reinforcing member of the outer layer from locally rubbing against the surface of the mating member. As a result, it is possible to prevent the damaging and coarsening of the surface of the mating member as much as possible due to friction, so that it is possible to prevent a decline in sealability. In addition, by virtue of the action of scraping an excess lubricating film formed on the surface of the mating member, the friction is made via the lubricating film of an appropriate thickness formed on the surface of the mating member. Hence, it is possible to prevent the generation of abnormal frictional noise as much as possible.

In this flat composite sheet member, in a case where a woven metal wire net and a braided metal wire net made from a fine metal wire having a wire diameter of 0.28 to 0.32 mm are used as the metal wire net of the reinforcing member for the outer layer, a method of pressurization is suitably used in which the pressurization, in the thicknesswise direction of the heat-resistant sheet member, of the reinforcing member for the outer layer with the heat-resistant sheet member for the outer layer inserted therein is effected, for example, by feeding the same into a nip between a cylindrical roller having a smooth outer peripheral surface and a roller having a cylindrical outer peripheral surface with a plurality of annular recessed grooves provided along the axial direction, and subsequently by further feeding the same into a nip between another pair of cylindrical rollers each having a smooth cylindrical outer peripheral surface. Meanwhile, in a case where a woven metal wire net and a braided metal wire net made from a fine metal wire having a wire diameter of 0.15 to 0.175 mm are used as the metal wire net of the reinforcing member for the outer layer, a method of pressurization is suitably used in which the pressurization, in the thicknesswise direction of the heat-resistant sheet member, of the reinforcing member for the outer layer with the heat-resistant sheet member for the outer layer inserted therein is effected, for example, by feeding the same into a nip between at least a pair of cylindrical rollers each having a smooth cylindrical outer peripheral surface. Incidentally, it goes without saying that it is also possible to adopt the latter method even in the case where a woven metal wire net and a braided metal wire net made from a fine metal wire having a wire diameter of 0.28 to 0.32 mm are used as the metal wire net of the reinforcing member for the outer layer, and that, conversely, it is also possible to adopt the former method even in the case where a woven metal wire net and a braided metal wire net made from a fine metal wire having a wire diameter of 0.15 to 0.175 mm are used as the metal wire net of the reinforcing member for the outer layer.

In the method of manufacturing a spherical annular seal member in accordance with the invention, in a preferred example, the density a of the heat-resistant material for the spherical annular base member is 1.0 to 1.5 $Mg/m^3$, preferably 1.0 to 1.2 $Mg/m^3$, while the density of the heat-resistant material for the outer layer is 0.3- to 0.6-fold the density of the heat-resistant material for the spherical annular base member, i.e., 0.3 to 0.9 $Mg/m^3$, preferably 0.3 to 0.6 $Mg/m^3$.

The surface roughness of the flat composite sheet member obtained in the aforementioned step (c) is, in a preferred example, 5 to 30 μm in an arithmetic average roughness Ra.

In the outer layer formed by this composite sheet member, even in the case where the composite sheet member is integrally formed with the partially convex spherical surface of the spherical annular base member, the reinforcing member for the outer layer is present in a scattered manner in the outer layer intermediate surface of the outer layer with an area ratio of 5 to 35%, and the surface roughness of the outer layer intermediate surface of the outer layer is 5 to 30 μm in the arithmetic average roughness Ra. Therefore, advantages are offered in that local friction with the surface of the mating member is prevented as much as possible in the friction with the surface of the mating member, thereby preventing the damaging and coarsening of the surface of the mating member as much as possible, with the result that the amount of gas leakage from frictional surfaces of the spherical annular seal member and the mating member can be minimized.

In the method of manufacturing a spherical annular seal member in accordance with the invention, the heat-resistant materials of the spherical annular base member and the outer layer may contain expanded graphite and at least one of 0.05 to 5.00 wt. % of phosphorus pentoxide and 1.0 to 16.0 wt. % of a phosphate. The lubricating composition which is coated on one surface of the composite sheet member may be an aqueous dispersion containing a polytetrafluoroethylene resin. The lubricating composition which is coated on one surface of the composite sheet member may be an aqueous dispersion in which a hexagonal boron nitride powder and a boron oxide powder are dispersedly contained in an alumina sol in which hydrated alumina particles are dispersedly contained in water containing an acid as a dispersion medium, and which exhibits a hydrogen ion concentration of 2 to 3, the aqueous dispersion containing as a solid content 70 to 85 wt. % of hexagonal boron nitride, 0.1 to 10 wt. % of boron oxide, and 5 to 20 wt. % of hydrated alumina. Alternatively, the lubricating composition which is coated on one surface of the composite sheet member may be an aqueous dispersion in which a hexagonal boron nitride powder and a boron oxide powder are dispersedly contained in an alumina sol in which hydrated alumina are dispersedly contained in water containing an acid as a dispersion medium, and which exhibits a hydrogen ion concentration of 2 to 3, the aqueous dispersion being one in which, in a lubricating composition component composed of 70 to 85 wt. % of hexagonal boron nitride, 0.1 to 10 wt. % of boron oxide, and 5 to 20 wt. % of hydrated alumina, a polytetrafluoroethylene resin is contained by not more than 300 parts by weight or not more than 200 parts by weight, preferably 50 to 200 parts by weight or 50 to 150 parts by weight, with respect to 100 parts by weight of that lubricating composition component as a solid content.

The acid which is contained in the water as the dispersion medium may be nitric acid, hydrated alumina may be selected from alumina monohydrate such as boehmite or diaspore, alumina trihydrate such as gibbsite or bayerite, and pseudo-boehmite.

Advantages of the Invention

In accordance with the invention, it is possible to provide a spherical annular seal member which is capable of preventing as much as possible the damaging and coarsening of the surface of the mating member in the friction with the mating member, and of preventing a decline in sealability and the generation of abnormal frictional noise, as well as a method of manufacturing the same.

BEST MODE FOR CARRYING OUT THE INVENTION

Hereafter, a more detailed description will be given of the present invention and the mode for carrying it out with reference to the preferred embodiments shown in the drawings. It should be noted that the present invention is not limited to these embodiments.

Figure 1:
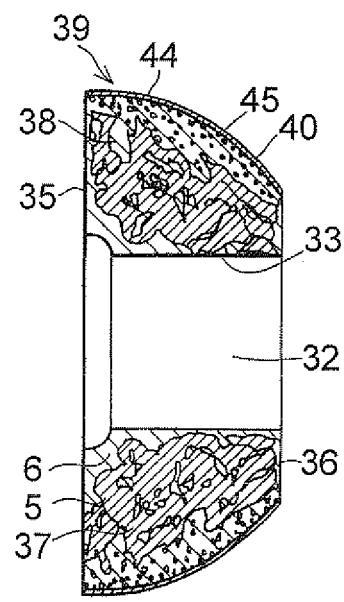
FIG. 1 is a vertical cross sectional view of a spherical annular seal member which is manufactured in accordance with an embodiment of the invention.

A description will be given of the constituent materials of a spherical annular seal member in accordance with the invention and a method of manufacturing the spherical annular seal member.

<Concerning Heat-Resistant Sheet Member I>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., a natural flake graphite powder having a particle size of 30 to 80 meshes is added to it, and reaction is allowed to take place for 30 minutes. After the reaction, an acidized graphite powder subjected to suction filtration is separated, and a cleaning operation is repeated twice in which the acidized graphite powder is agitated in water for 10 minutes and is then subjected to suction filtration, thereby sufficiently removing the sulfuric acid content from the acidized graphite powder. Then, the acidized graphite powder with the sulfuric acid content sufficiently removed is dried for 3 hours in a drying furnace held at a temperature of 110° C., and this is used as an acidized graphite powder.

The aforementioned acidized graphite powder is subjected to heat (expansion) treatment for 1 to 10 seconds at a temperature of 950 to 1200° C. to generate pyrolysis gases, to thereby form expanded graphite particles (expansion factor: 240- to 300-fold) expanded by expanding gaps between graphite layers by the gas pressure. An expanded graphite sheet with a desired thickness is fabricated by roll-forming these expanded graphite particles by feeding them to a double-roller apparatus with its roll nip adjusted to a desired nip, and this expanded graphite sheet is used as a heat resistant sheet member I.

<Concerning Heat-Resistant Sheet Members II and III>

While agitating the aforementioned acidized graphite powder, a solution in which at least one of aqueous orthophosphoric acid of an 84% concentration as a phosphoric acid and aqueous aluminum primary phosphate of a 50% concentration as a phosphate is diluted by methanol is compounded with the acidized graphite material by spraying, and is agitated uniformly to prepare a wet mixture. This wet mixture is dried for 2 hours in the drying furnace held at a temperature of 120° C. Then, this dried mixture is subjected to heat (expansion) treatment for 1 to 10 seconds at a temperature of 950 to 1200° C. to generate pyrolysis gases, to thereby form expanded graphite particles (expansion factor: 240- to 300-fold) expanded by expanding gaps between graphite layers by the gas pressure. In this expansion treatment process, orthophosphoric acid among the components undergoes dehydration reaction to generate phosphorus pentoxide, while, as for the aluminum primary phosphate, water in its structural formula is desorbed. An expanded graphite sheet with a desired thickness is fabricated by roll-forming these expanded graphite particles by feeding them to a double-roller apparatus with its roll, nip adjusted to a desired nip, and these expanded graphite sheets are respectively used as heat resistant sheet members II and III.

0.05 to 5.0 wt. % of phosphorus pentoxide or 1 to 16 wt. % of aluminum primary phosphate is contained in the heat-resistant sheet member II thus fabricated, while 0.05 to 5.00 wt. % of phosphorus pentoxide and 1 to 16 wt. % of aluminum primary phosphate are contained in the heat-resistant sheet member III. The expanded graphite which contains at least one of the phosphoric acid and the phosphate permits use at, for example, 500° C. or in a high-temperature range exceeding 500° C. since the heat resistance of the expanded graphite itself is improved and the oxidation inhibiting action is imparted thereto. Here, as the phosphoric acid, it is possible to use, in addition to orthophosphoric acid, metaphosphoric acid, polyphosphoric acid, polymetaphosphoric acid, and the like. As the phosphate, it is possible to use, in addition to the aluminum primary phosphate, lithium primary phosphate, lithium secondary phosphate, calcium primary phosphate, calcium secondary phosphate, aluminum secondary phosphate, and the like.

In the above-described heat-resistant materials I, II, and III, as the heat-resistant materials I, II, and III which are used for a spherical annular base member, heat-resistant materials having a density of 1.0 to 1.5 $Mg/m^3$, preferably 1.0 to 1.2 $Mg/m^3$, at the time of manufacturing the spherical annular seal member are suitably used. Meanwhile, as the heat-resistant materials I, II, and III which are used for an outer layer, heat-resistant materials having a density of 0.3- to 0.6-fold the density of the heat-resistant materials I, II, and III used for the aforementioned spherical annular base member at the time of manufacturing the spherical annular seal member, i.e., 0.3 to 0.9 $Mg/m^3$, preferably 0.3 to 0.6 $Mg/m^3$, are suitably used.

<Concerning Reinforcing Member>

As a reinforcing member, a woven metal wire net or a braided wire net is used which is formed by weaving or knitting by using one or more fine metal wires including, as an iron-based wire, a stainless steel wire made of such as austenitic stainless steels SUS 304, SUS 310S, and SUS 316, a ferritic stainless steel SUS 430, or an iron wire (JIS G 3532) or a galvanized iron wire (JIS G 3547), or, as a copper-based wire, a copper-nickel alloy (cupro-nickel) wire, a copper-nickel-zinc alloy (nickel silver) wire, a brass wire, or a beryllium copper wire.

Figure 5:
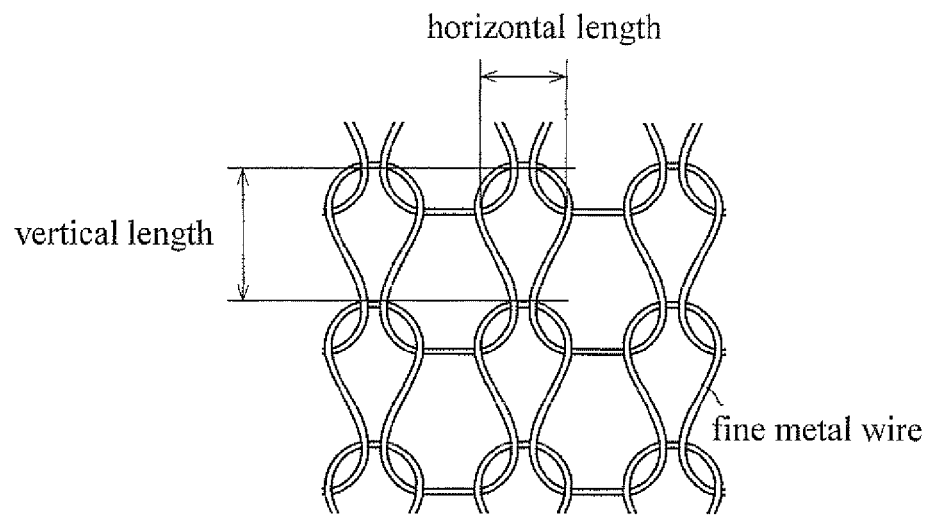
FIG. 5 is a plan view illustrating meshes of a metal wire net of the reinforcing member.

As for the fine metal wire for forming the metal wire net, a fine metal wire whose wire diameter is in the range of 0.15 to 0.32 mm, specifically fine metal wires whose wire diameters are 0.15, 0.175, 0.28, and 0.32 mm, are suitably used. As for the metal wire net as the reinforcing member for the spherical annular base member, a fine metal wire having a wire diameter of the upper limit side of the aforementioned range, e.g., 0.28 to 0.32 mm, is suitably used. In terms of the size of the mesh of a woven metal wire net or a braided metal wire net formed by the fine metal wire of that wire diameter, a metal wire net with a vertical mesh length of 4 to 6 mm or thereabouts and a horizontal mesh length of 3 to 5 mm or thereabouts in FIG. 5 illustrating a braided metal wire net is suitably used. In addition, as for the metal wire net as the reinforcing member for an outer layer, a woven metal wire net or a braided metal wire net made from a fine metal wire of 0.28 to 0.32 mm, which wire diameter is the same diameter as the wire diameter of the fine metal wire for forming the metal wire net as the reinforcing member for the spherical annular base member, or a fine metal wire having a wire diameter of the lower limit side of the aforementioned range, e.g., 0.15 to 0.175 mm, is suitably used. In terms of the size of the mesh of a woven metal wire net or a braided metal wire net formed by the fine metal wire of that wire diameter, a metal wire net with a vertical mesh length of 2.5 to 3.5 mm and a horizontal mesh length of 1.5 to 2.5 mm in FIG. 5 illustrating the braided metal wire net is suitably used.

<Concerning Lubricating Composition>

A lubricating composition for forming a coating layer (sliding layer) is used in the form of (1) an aqueous dispersion in which a lubricating composition composed of a polytetrafluoroethylene resin (hereafter abbreviated as "PTFE") powder is contained as a solid content; (2) an aqueous dispersion in which a hexagonal boron nitride powder and a boron oxide powder are dispersedly contained in an alumina sol in which hydrated alumina particles are dispersed in water containing an acid as a dispersion medium, and which exhibits a hydrogen ion concentration of 2 to 3, the aqueous dispersion containing as a solid content a lubricating composition composed of 70 to 85 wt. % of hexagonal boron nitride, 0.1 to 10 wt. % of boron oxide, and 5 to 20 wt. % of hydrated alumina; or (3) an aqueous dispersion containing as a solid content a lubricating composition in which, in the aforementioned lubricating composition composed of 70 to 85 wt. % of hexagonal boron nitride, 0.1 to 10 wt. % of boron oxide, and 5 to 20 wt. % of hydrated alumina, PTFE is dispersedly contained by not more than 300 parts by weight or not more than 200 parts by weight, preferably 50 to 200 parts by weight or 50 to 150 parts by weight with respect to 100 parts by weight of that lubricating composition.

In the aforementioned lubricating composition (2), the hexagonal boron nitride exhibits excellent lubricity particularly in a high-temperature range and accounts for 70 to 85 wt. % as a principal component. The boron oxide, per se, among the components does not exhibit lubricity, but by being contained in the hexagonal boron nitride constituting the principal component, the boron oxide brings out the lubricity inherent in the hexagonal boron nitride and contributes to the reduction of friction particularly in a high-temperature range. Further, its compounding amount is 0.1 to 10 wt. %, preferably 3 to 5 wt. %. In addition, the hydrated alumina, per se, among the components does not exhibit lubricity, but by being compounded with the aforementioned hexagonal boron nitride and boron oxide, the hydrated alumina improves the adherence of the lubricating composition onto the heat-resistant material surface and demonstrates an effect in the formation of a firm coating layer, and exhibits the function of bringing out the lubricity of the hexagonal boron nitride by promoting the sliding between layers of plate crystals of the hexagonal boron nitride. Furthermore, the compounding amount of hydrated alumina is preferably 5 to 20 wt. %, more preferably 7 to 15 wt. %. If the content of the hydrated alumina is less than 5 wt. %, there is no effect on the improvement of the above-described adherence of the lubricating composition, and if it is contained in excess of 20 wt. %, the aqueous dispersion during manufacturing becomes excessively viscous, which aggravates the adhering operation of roller coating, brush coating or the like.

In addition, in the lubricating composition (3), the PTFE itself, which is contained in the lubricating composition composed of 70 to 85 wt. % of hexagonal boron nitride, 0.1 to 10 wt. % of boron oxide, and 5 to 20 wt. % of hydrated alumina, possesses low frictional properties, and by being contained in the lubricating composition, the PTFE improves the low frictional properties of that lubricating composition, ameliorates the low frictional properties of the coating layer (sliding layer) constituted of that lubricating composition, does not cause a stick-slip phenomenon in the friction with the mating member, and is thereby capable of avoiding as much as possible the generation of abnormal frictional noise attributable to the stick-slip phenomenon, and exhibits the action of enhancing the ductility of the lubricating composition forming. As a result, it is possible to form a film coating layer.

In the aforementioned alumina sol, the acid which is contained in water serving as a dispersion medium acts as a deflocculant for stabilizing the alumina sol. As the acid, it is possible to cite as preferable examples inorganic acids such as hydrochloric acid, nitric acid, sulfuric acid, and amidosulfuric acid, but nitric acid is particularly preferable. Further, as the alumina sol, one which exhibits a hydrogen ion concentration (pH) of 2 to 3 is recommended. If the hydrogen ion concentration is less than 2, the alumina sol itself becomes unstable, and if the hydrogen ion concentration exceeds 3, the viscosity of the alumina sol becomes high, and the alumina sol is like to coagulate and becomes unstable.

The hydrated alumina in the alumina sol is a compound which is expressed by a compositional formula $Al_2O_3 \cdot nH_2O$ (in the compositional formula, $0<n<3$). In this compositional formula, n is a number which is normally in excess of 0 and less than 3, preferably 0.5 to 2, more preferably 0.7 to 1.5 or thereabouts. As the hydrated alumina, it is possible to cite alumina monohydrate (aluminum hydroxide oxide) such as boehmite ($Al_2O_3 \cdot H_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of the method of manufacturing the spherical annular seal member composed of the above-described constituent materials.

Figure 3:
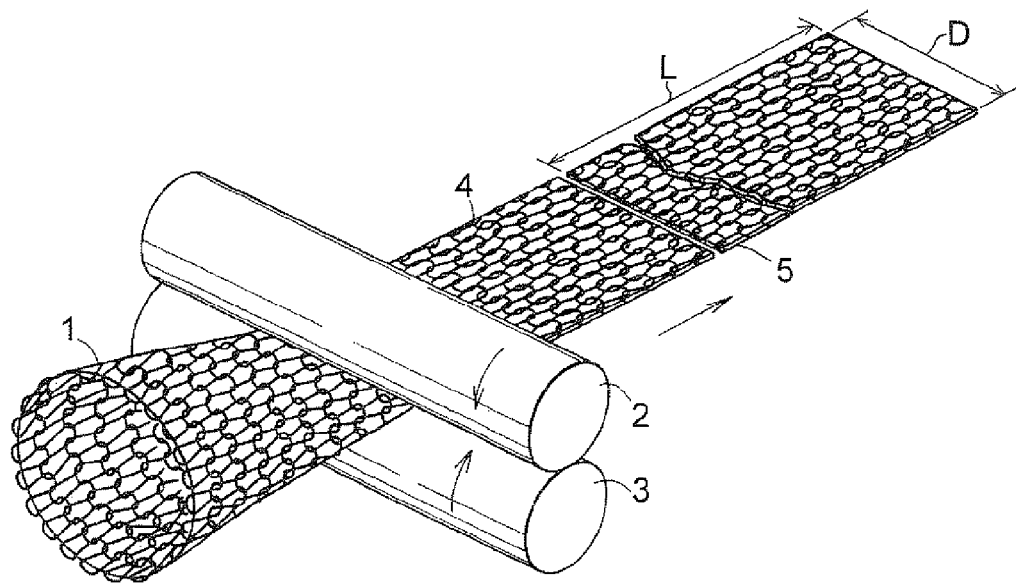
FIG. 3 is a diagram explaining a method of forming a reinforcing member in the process of manufacturing the spherical annular seal member in accordance with the invention.

(First Process) As shown in FIG. 3, a belt-shaped metal wire net 4 with a predetermined width D is fabricated by passing into a nip between rollers 2 and 3 a cylindrical braided metal wire net 1 formed by knitting fine metal wires with a wire diameter of 0.15 to 0.32 mm, preferably 0.28 to 0.32 mm, into a cylindrical shape and having a mesh size of 4 to 6 mm or thereabouts (vertical) and 3 to 5 mm or thereabouts (horizontal) (see FIG. 5). The belt-shaped metal wire net 4 is cut into a predetermined length L, thereby preparing a reinforcing member 5 for the spherical annular base member.

Figure 4:
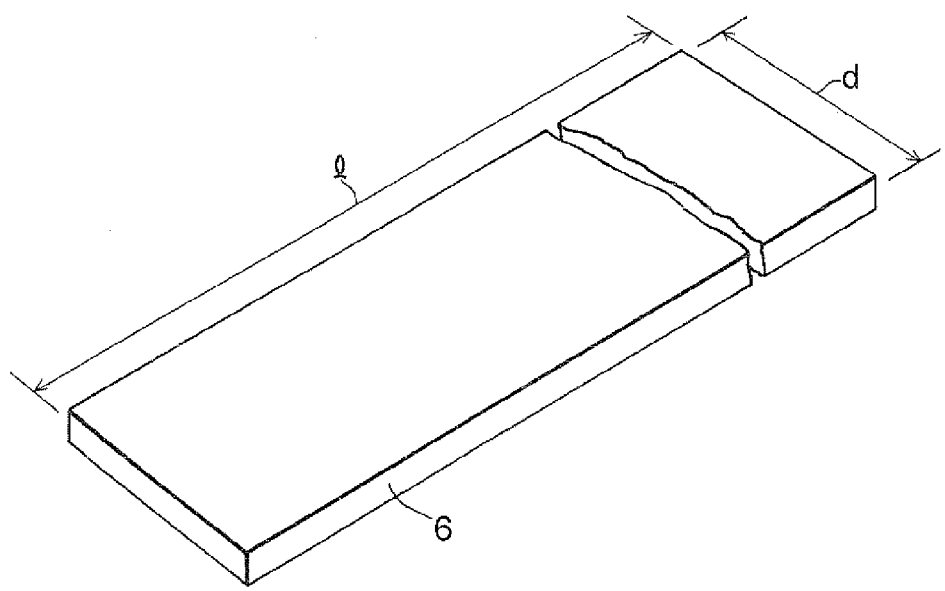
FIG. 4 is a perspective view of a heat-resistant material in the process of manufacturing the spherical annular seal member in accordance with the invention.

(Second Process) As shown in FIG. 4, a heat-resistant material (constituted of one of the heat-resistant materials I, II, and III) 6 for the spherical annular base member is prepared which has a density of 1.0 to 1.5 $Mg/m^3$, preferably 1.0 to 1.2 $Mg/m^3$, such as to have a width d of 1.10×D to 2.10×D with respect to the width D of the aforementioned reinforcing member 5 and a length l of 1.30×L to 2.70×L with respect to the length L of the aforementioned reinforcing member 5.

Figure 6:
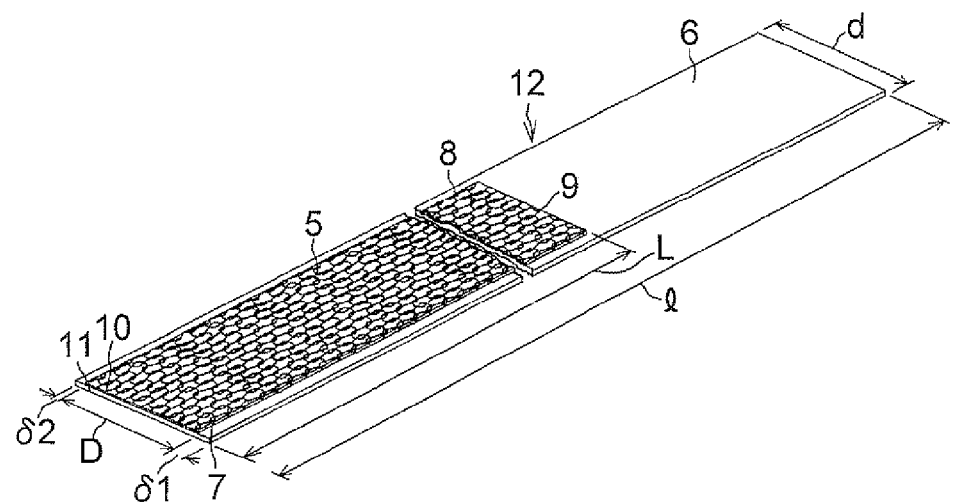
FIG. 6 is a perspective view of a superposed assembly in the process of manufacturing the spherical annular seal member in accordance with the invention.

(Third Process) A superposed assembly 12, in which the heat-resistant material 6 and the reinforcing member 5 are superposed on top of each other, is obtained as follows: To ensure that the heat-resistant material 6 is wholly exposed at least on a large-diameter-side annular end face 35 which is an annular end face on one axial end side of a partially convex spherical outer surface 34 (see FIG. 2) in a spherical annular seal member 39 (see FIG. 1) which will be described later, as shown in FIG. 6, the heat-resistant material 6 is made to project in the widthwise direction by 0.1×D to 0.8×D, at maximum, from one widthwise end 7 of the reinforcing member 5, which becomes the large-diameter-side annular end face 35 of the partially convex spherical outer surface 34. Also, the amount of widthwise projection, δ1, of the heat-resistant material 6 from the end 7 becomes greater than the amount of its widthwise projection, δ2, from the other widthwise end 8 of the reinforcing member 5, which becomes a small-diameter-side annular end face 36 of the partially convex spherical outer surface 34. Also, the heat-resistant material 6 is made to project in the longitudinal direction by 0.3×L to 1.7×L, at maximum, from one longitudinal end 9 of the reinforcing member 5. Also, the other longitudinal end 10 of the reinforcing member 5 and a longitudinal end 11 of the heat-resistant material 6 corresponding to that end 10 are made to substantially agree with each other, and the widthwise and lengthwise directions of the reinforcing member 5 and the heat-resistant material 6 are made to agree with each other.

Figure 7:
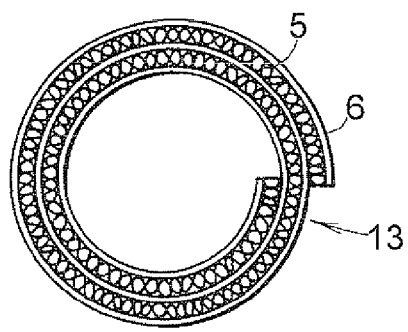
FIG. 7 is a plan view of a tubular base member in the process of manufacturing the spherical annular seal member in accordance with the invention.
Figure 8:
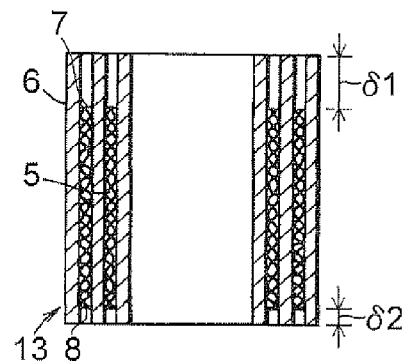
FIG. 8 is a vertical cross-sectional view of the tubular base member shown in FIG. 7.

(Fourth Process) As shown in FIG. 7, the superposed assembly 12 is convoluted spirally with the heat-resistant material 6 placed on the inner side, such that the heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of 1.30×L to 2.70×L with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the heat-resistant material 6 on its one widthwise end side projects in the widthwise direction by δ1 from the one end 7 of the reinforcing member 5, and the heat-resistant material 6 on its other widthwise end side projects in the widthwise direction by δ2 from the other end 8 of the reinforcing member 5.

(Fifth Process) A heat-resistant material 14 (one of the heat-resistant materials I, II, and III) for the outer layer is separately prepared which has a density of 0.3 to 0.9 $Mg/m^3$, preferably 0.3 to 0.6 $Mg/m^3$.

(Sixth Process)

Figure 9:
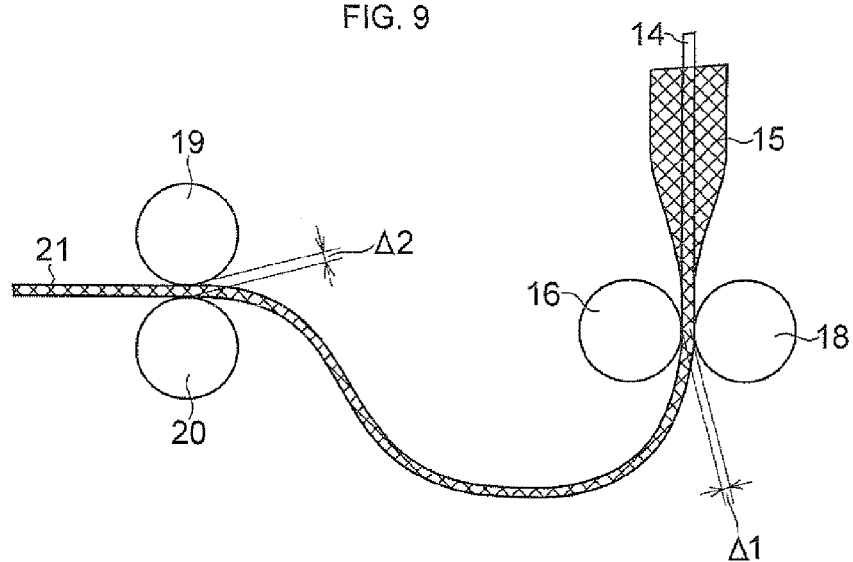
FIG. 9 is a diagram explaining the process of fabricating a composite sheet member in the process of manufacturing the spherical annular seal member in accordance with the invention.
Figure 10:
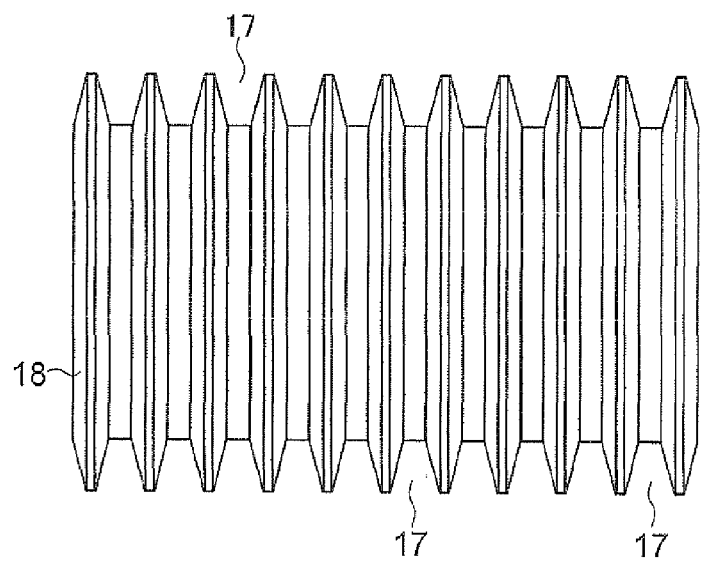
FIG. 10 is a front elevational view of a roller having a plurality of annular recessed grooves in the fabrication process shown in FIG. 9.
Figure 11:
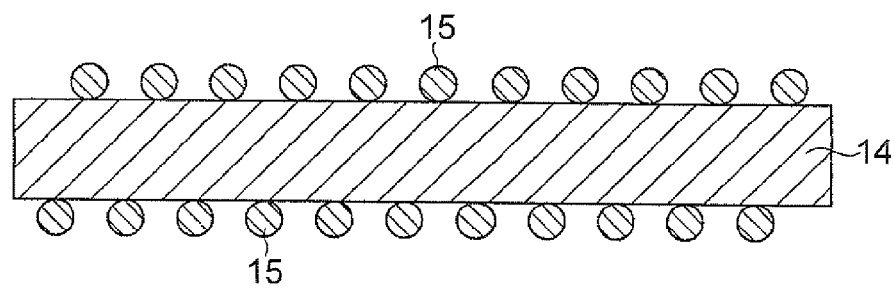
FIG. 11 is an explanatory diagram illustrating a state in which the heat-resistant material is inserted in the reinforcing member made from a cylindrical braided metal wire net in the fabrication process shown in FIG. 9.
Figure 12:
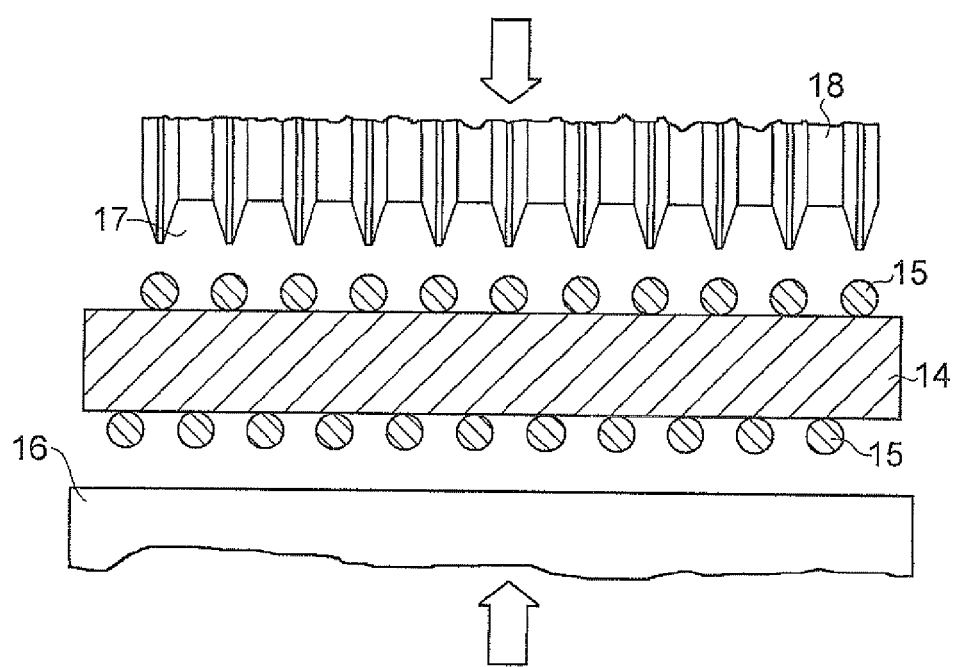
FIG. 12 is an explanatory diagram illustrating a state in which the heat-resistant material inserted in the reinforcing member is positioned between a cylindrical roller and the roller having the plurality of annular recessed grooves in the fabrication process shown in FIG. 9.
Figure 13:
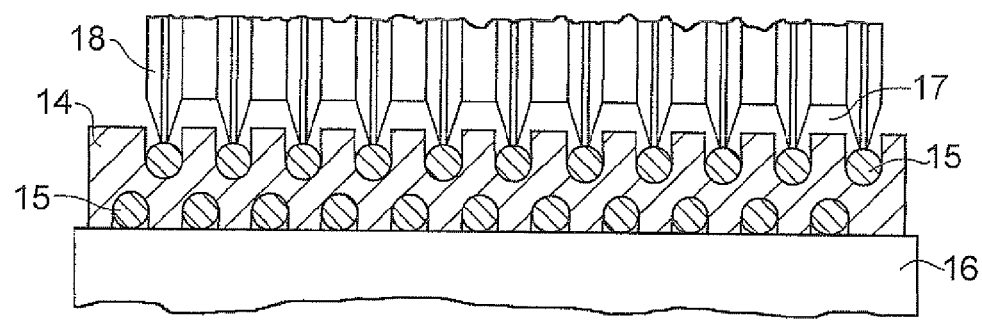
FIG. 13 is an explanatory diagram illustrating a state in which the heat-resistant material inserted in the reinforcing member is being pressurized between the cylindrical roller and the roller having the plurality of annular recessed grooves in the fabrication process shown in FIG. 9.
Figure 14:
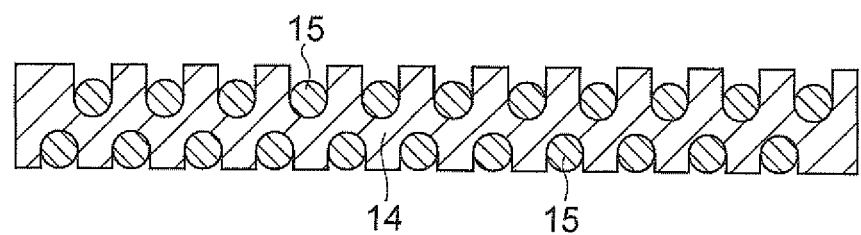
FIG. 14 is an explanatory diagram illustrating a state after the heat-resistant material inserted in the reinforcing member has been pressurized between the cylindrical roller and the roller having the plurality of annular recessed grooves in the fabrication process shown in FIG. 9.
Figure 15:
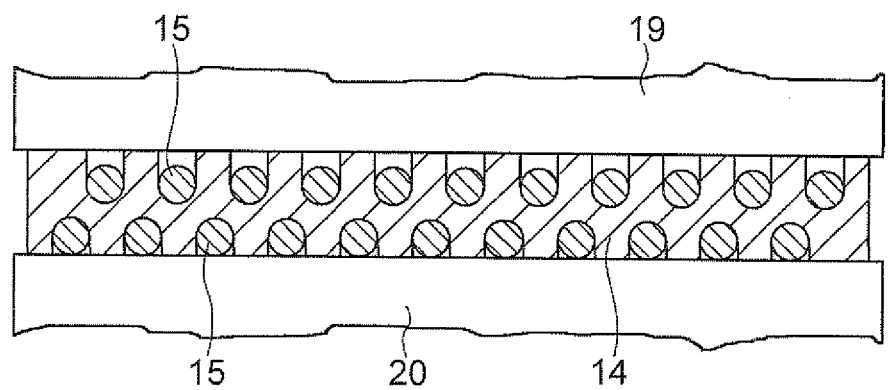
FIG. 15 is an explanatory diagram illustrating a state in which the heat-resistant material inserted in the reinforcing member is being pressurized by a pair of cylindrical rollers after having been pressurized between the cylindrical roller and the roller having the plurality of annular recessed grooves in the fabrication process shown in FIG. 9.
Figure 16:
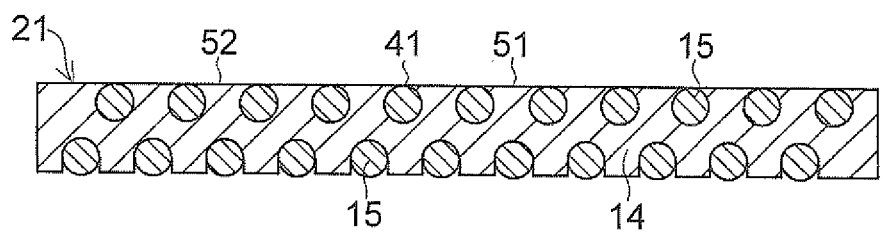
FIG. 16 is an explanatory diagram illustrating the composite sheet member.
Figure 17:
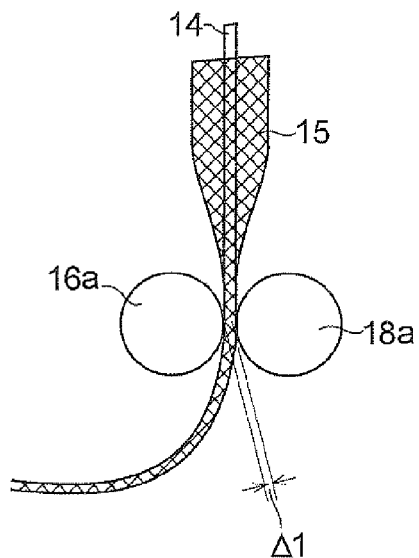
FIG. 17 is a diagram explaining another process of fabricating the composite sheet member in the process of manufacturing the spherical annular seal member in accordance with the invention.
Figure 18:
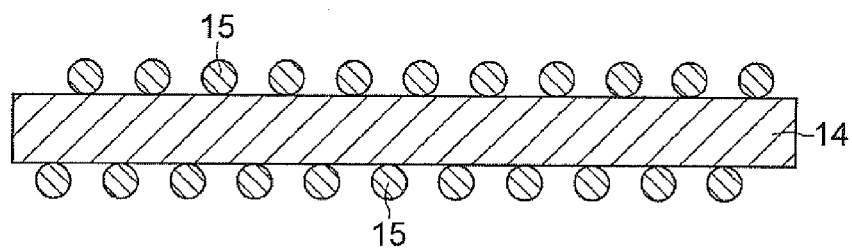
FIG. 18 is an explanatory diagram illustrating a state in which the heat-resistant material is inserted in the reinforcing member made from the cylindrical braided metal wire net in the fabrication process shown in FIG. 17.
Figure 19:
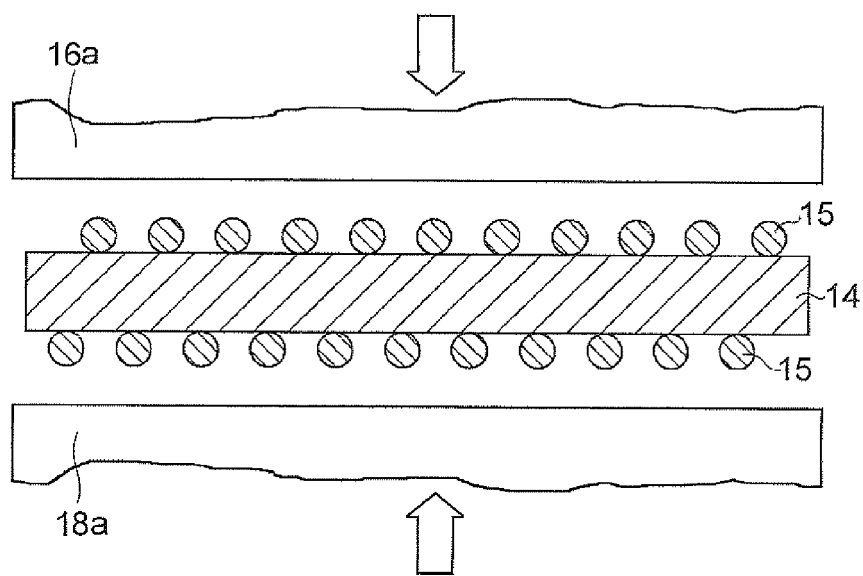
FIG. 19 is an explanatory diagram illustrating a state in which the heat-resistant material inserted in the reinforcing member is positioned between a pair of cylindrical rollers in the fabrication process shown in FIG. 17.
Figure 20:
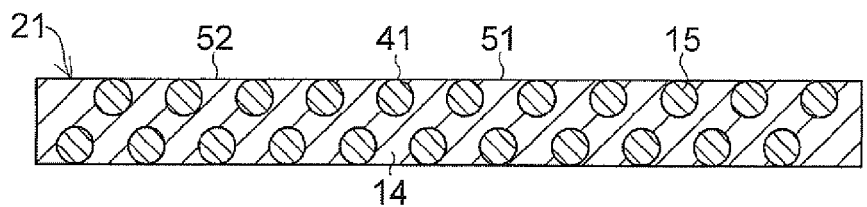
FIG. 20 is an explanatory diagram illustrating the composite sheet member.

<First Method> The heat-resistant material 14 for the outer layer is continuously inserted (see FIG. 9) into a reinforcing member 15 for the outer layer constituted of a cylindrical braided metal wire net (the size of the mesh of the braided metal wire net being 2.5 to 3.5 mm (vertical) and 1.5 to 2.5 mm (horizontal)) obtained by continuously knitting fine metal wires with a wire diameter of 0.15 to 0.32 mm, preferably 0.15 to 0.28 mm, by a knitting machine (not shown). The reinforcing member 15 with that heat-resistant material 14 inserted therein, starting with its insertion-starting end side, is fed into a nip Δ1 between a cylindrical roller 16 having a smooth cylindrical outer peripheral surface and a roller 18 (see FIGS. 9 and 10) having a cylindrical outer peripheral surface with a plurality of annular recessed grooves 17 along its axial direction, and is thereby pressurized (see FIGS. 9, 11, 12, 13, and 14) in the thicknesswise direction of that heat-resistant material 14. The reinforcing member 15 with the heat-resistant material 14 inserted therein is further fed (see FIGS. 9 and 15) into a nip Δ2 between another pair of cylindrical rollers 19 and 20 having smooth cylindrical outer peripheral surfaces and is pressurized by the other pair of cylindrical rollers 19 and 20. Thus, a flat composite sheet member 21 (see FIG. 16) is formed in which the heat-resistant material 14 for the outer layer and the reinforcing member 15 for the outer layer are press bonded to each other such that the heat-resistant material 14 for the outer layer is densely filled in the meshes of the metal wire net of the reinforcing member 15 for the outer layer, and the reinforcing member 15 for the outer layer is embedded in that heat-resistant material 14 for the outer layer, thereby forming the surface of the heat-resistant material 14 for the outer layer and the surface of the reinforcing member 15 for the outer layer flush with each other and allowing the surface of the heat-resistant material 14 and the surface of the reinforcing member 15 to be exposed. This flat composite sheet member 21 is cut into a length of such a measure that it can be wound around the outer peripheral surface of the tubular base member 13 by one turn.

The nip Δ1 between the cylindrical roller 16 and the roller 18 having the plurality of annular recessed grooves 17 on its outer peripheral surface along the axial direction is preferably set in the range of 0.35 to 0.60 mm, and the nip Δ2 between the pair of rollers 19 and 20 is preferably set in the range of 0.45 to 0.65 mm.

<Second Method> As shown in FIGS. 17 to 20, a heat-resistant material 14 (one of the heat-resistant materials I, II, and III) for the outer layer is separately prepared which has a density of 0.3 to 0.9 Mg/m$^3$, preferably 0.3 to 0.6 Mg/m$^3$. The heat-resistant material 14 for the outer layer is continuously inserted (see FIG. 17) into a reinforcing member 15 for the outer layer constituted of a cylindrical braided metal wire net (the size of the mesh of the braided metal wire net being 2.5 to 3.5 mm (vertical) and 1.5 to 2.5 mm (horizontal)) obtained by continuously knitting fine metal wires with a wire diameter of 0.15 to 0.32 mm, preferably 0.15 to 0.175 mm, by a knitting machine (not shown). The reinforcing member 15 for the outer layer with that heat-resistant material 14 inserted therein, starting with its insertion-starting end side, is fed into the nip Δ1 between a pair of cylindrical rollers 16a and 18a having smooth cylindrical outer peripheral surfaces, and is thereby pressurized (see FIGS. 18 and 19) in the thicknesswise direction of that heat-resistant material 14. Thus, a flat composite sheet member 21 (see FIG. 20) is formed in which the heat-resistant material 14 for the outer layer and the reinforcing member 15 for the outer layer are press bonded to each other such that the heat-resistant material 14 for the outer layer is densely filled in the meshes of the metal wire net of the reinforcing member 15 for the outer layer, and the reinforcing member 15 for the outer layer is embedded in that heat-resistant material 14 for the outer layer, thereby forming the surface of the heat-resistant material 14 for the outer layer and the surface of the reinforcing member 15 for the outer layer flush with each other and allowing the surface of the heat-resistant material 14 and the surface of the reinforcing member 15 to be exposed. This flat composite sheet member 21 is cut into a length of such a measure that it can be wound around the outer peripheral surface of the tubular base member 13 by one turn.

The nip Δ1 between the aforementioned pair of cylindrical rollers 16a and 18a is preferably set in the range of 0.35 to 0.60 mm. It should be noted that, in the above-described second method as well, a step may be inserted in which the reinforcing member 15 with the heat-resistant material 14 inserted therein is further fed (see FIGS. 9 and 15) into the nip Δ2 between another pair of cylindrical rollers 19 and 20 having smooth cylindrical outer peripheral surfaces in the above-described first method.

Figure 21:
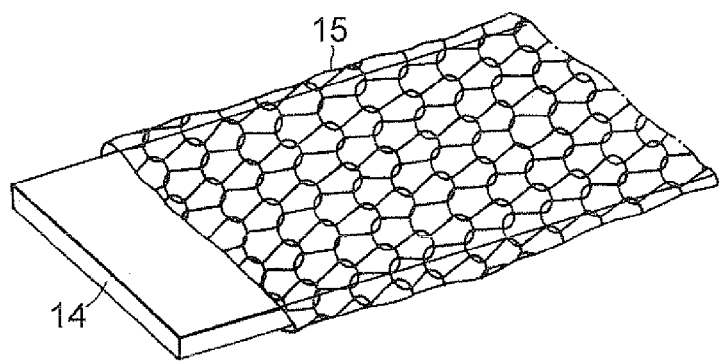
FIG. 21 is a diagram explaining still another process of fabricating the composite sheet member in the process of manufacturing the spherical annular seal member in accordance with the invention.
Figure 22:
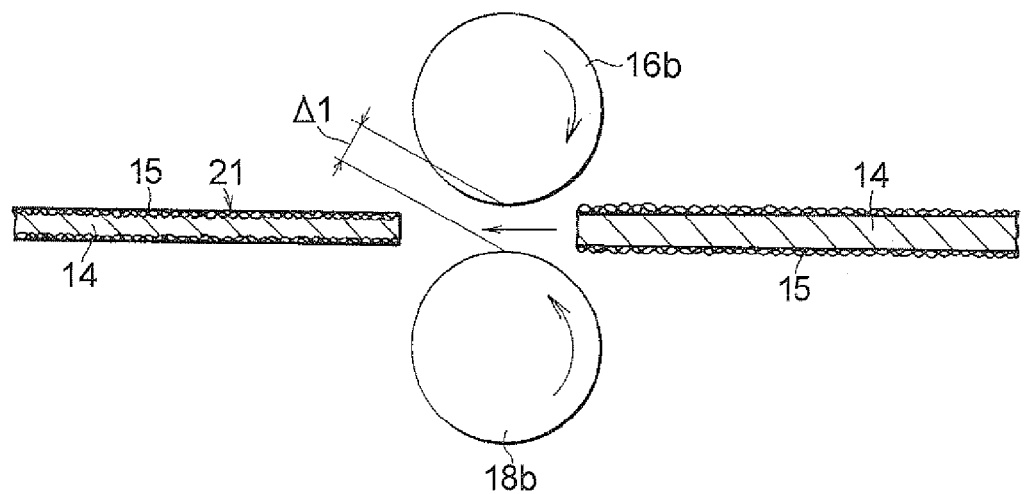
FIG. 22 is an explanatory diagram illustrating a state in which the heat-resistant material inserted in the reinforcing member is pressurized by a pair of rollers in the fabrication process shown in FIG. 21.

<Third Method> As shown in FIGS. 21 to 22, a heat-resistant material 14 (one of the heat-resistant materials I, II, and III) for the outer layer is separately prepared which has a width d smaller than the width D of the reinforcing member (belt-shaped metal wire net) for the outer layer and has a density of 0.3 to 0.9 Mg/m$^3$, preferably 0.3 to 0.6 Mg/m$^3$, in the same way as the heat-resistant material 14 for the outer layer obtained in the above-described fifth process. The reinforcing member 15 for the outer layer made from a cylindrical braided metal wire net formed by knitting fine metal wires with a wire diameter of 0.15 to 0.32 mm, preferably 0.15 to 0.175 mm, is passed into a nip between the pair of cylindrical rollers 2 and 3 to thereby fabricate the belt-shaped metal wire net 4 (see FIG. 3). This belt-shaped metal wire net 4 is cut in advance into such a measure that it can be wound around the outer peripheral surface of the tubular base member 13 by one turn. The heat-resistant material 14 for the outer layer is inserted into that belt-shaped metal wire net 4 (see FIG. 21). The belt-shaped metal wire net 4 with the heat-resistant material 14 for the outer layer inserted therein is fed into the nip Δ1 between a pair of cylindrical rollers 16b and 18b, and is thereby pressurized in the thicknesswise direction of that heat-resistant material 14 for the outer layer. Thus, a flat composite sheet member 21 (see FIG. 22) is formed in which the heat-resistant material 14 for the outer layer and the reinforcing member 15 for the outer layer are press bonded to each other such that the heat-resistant material 14 for the outer layer is embedded in the meshes of the metal wire net of the reinforcing member 15 for the outer layer made from the belt-shaped metal wire net 4, thereby forming the surface of the heat-resistant material 14 for the outer layer and the surface of the reinforcing member 15 for the outer layer flush with each other and allowing the surface of the heat-resistant material 14 for the outer layer and the surface of the reinforcing member 15 for the outer layer to be exposed. This flat composite sheet member 21 is cut into a length of such a measure that it can be wound around the outer peripheral surface of the tubular base member 13 by one turn.

The nip Δ1 between the aforementioned pair of cylindrical rollers 16b and 18b is preferably set in the range of 0.35 to 0.60 mm. It should be noted that, the third method may include a step of feeding the belt-shaped metal wire net 4 with the heat-resistant material 14 for the outer layer inserted therein into the nip Δ2 between another pair of cylindrical rollers 19 and 20 having smooth cylindrical outer peripheral surfaces and pressurizing the same by the cylindrical rollers 19 and 20 in the above-described first method.

<Fourth Method (Not shown)> A heat-resistant material 14 (one of the heat-resistant materials I, II, and III) for the outer layer is separately prepared which has the same width as the width D of the reinforcing member (belt-shaped metal wire net) for the outer layer and has a density of 0.3 to 0.9 Mg/m$^3$, preferably 0.3 to 0.6 Mg/m$^3$, in the same way as the heat-resistant material 14 for the outer layer obtained in the above-described fifth process. A plain woven metal wire net is prepared as a woven metal wire net which is formed by weaving fine metal wires with a wire diameter of 0.15 to 0.32 mm, preferably 0.15 to 0.175 mm. The reinforcing member 15 for the outer layer constituted of this plain woven metal wire net is cut into a predetermined length and width, thereby preparing two reinforcing members 15. The aforementioned heat-resistant material 14 for the outer layer is inserted (placed) between the two reinforcing members 15 for the outer layer, and an assembly thereof is fed into a nip between a pair of cylindrical rollers, and is thereby pressurized in the thicknesswise direction of that heat-resistant material 14. Thus, a flat composite sheet member 21 is formed in which the heat-resistant material 14 for the outer layer and the reinforcing member 15 for the outer layer are press bonded to each other such that the heat-resistant material 14 for the outer layer is densely filled in the meshes of the metal wire net of the reinforcing member 15 for the outer layer made from the plain woven metal wire net, and the reinforcing member 15 for the outer layer is embedded in that heat-resistant material 14 for the outer layer, thereby forming the surface of the heat-resistant material 14 for the outer layer and the surface of the reinforcing member 15 for the outer layer flush with each other and allowing the surface of the heat-resistant material 14 for the outer layer and the surface of the reinforcing member 15 for the outer layer to be exposed. This flat composite sheet member 21 is cut into a length of such a measure that it can be wound around the outer peripheral surface of the tubular base member 13 by one turn.

The nip between the aforementioned pair of cylindrical rollers is preferably set in the range of 0.35 to 0.60 mm. It should be noted that, the above-described fourth method may include a step of feeding the superposed assembly of the heat-resistant material 14 for the outer layer and the two reinforcing members 15 for the outer layer into the nip Δ2 between another pair of cylindrical rollers 19 and 20 having smooth cylindrical outer peripheral surfaces by the cylindrical rollers 19 and 20 in the above-described first method.

In one surface 51 of the flat composite sheet member 21 obtained in one of the above-described first, second, third, and fourth methods, the ratio of the area of a surface 41 of the reinforcing member 15 for the outer layer, which is exposed together with a surface 52 of the heat-resistant material 14 for the outer layer, is preferably 5 to 35% of the area of the one surface 51 of the composite sheet member 21. Further, the surface roughness of the one surface 51 of the flat composite sheet member 21 having the surface 41 of the reinforcing member 15 for the outer layer, which is exposed together with the surface 52 of the heat-resistant material 14 for the outer layer, is preferably 5 to 30 μm in terms of the arithmetic average roughness Ra.

In the composite sheet member 21, the spring back of each of the reinforcing members 15 for the outer layer is small after being respectively pressurized by the cylindrical roller 16 and the roller 18 having the plurality of annular recessed grooves 17 on its outer peripheral surface along the axial direction and further by the pair of cylindrical rollers 19 and 20 (the above-described first method), or by the pair of cylindrical rollers 16a and 18a having smooth cylindrical outer peripheral surfaces and, in some cases, further by the pair of cylindrical rollers 19 and 20 (the above-described second method), or by the above-described third and fourth methods. Meanwhile, the density of the heat-resistant material 14 for the outer layer is low with a density of 0.3 to 0.9 Mg/m$^3$ (0.3- to 0.6-fold the density of the heat-resistant material 6 for the spherical annular base member). For these reasons, through the pressurizing process in the thicknesswise direction of that heat-resistant material 14, the heat-resistant material 14 for the outer layer and the reinforcing member 15 for the outer layer are press bonded to each other such that the heat-resistant material 14 for the outer layer is densely filled without gaps in the meshes of the metal wire net of the reinforcing member 15 for the outer layer, and the reinforcing member 15 for the outer layer is embedded in the heat-resistant material 14 of the outer layer. As the surface 41 of the reinforcing member 15 is exposed together with the surface 52 of the heat-resistant material 14 in the one surface 51 of the composite sheet member 21, the ratio of the occupying area of the surface 41 of the reinforcing member 15 in an outer layer intermediate surface 42 (see FIGS. 1 and 2) of an outer layer 38 of the final spherical annular seal member 39 becomes 5 to 35%.

In addition, the surface roughness of the composite sheet member 21, in which the surface 41 of the reinforcing member 15 is exposed with an area ratio of 5 to 35% together with the surface 52 of the heat-resistant material 14 of the one surface 51 of the composite sheet member 21, is 5 to 30 μm in terms of the arithmetic average roughness Ra.

A description will be given of the results of image measurement of the ratio of the exposed surface of the surface 41 of the reinforcing member 15 for the outer layer exposed on the one surface 51 of the composite sheet member 21, as well as the results in which the surface roughness of the one surface 51 of the composite sheet member 21 where the surface 41 of the reinforcing member 15 for the outer layer was exposed was measured in terms of the arithmetic average roughness Ra.

One of cylindrical braided metal wire net having a mesh size of 3.5 mm (vertical) and 1.5 mm (horizontal) was fabricated by using an SUS 304 wire with a wire diameter of 0.15 mm and by using an SUS 304 wire with a wire diameter of 0.28 mm, and the other cylindrical braided metal wire net having a mesh size of 3.5 mm (vertical) and 1.5 mm (horizontal) was fabricated by using an SUS 304 wire with a wire diameter of 0.15 mm and by using an SUS 304 wire with a wire diameter of 0.28 mm. A heat-resistant sheet member 14 constituted of expanded graphite and having a density of 0.3 Mg/m$^3$ and a thickness of 1.5 mm was inserted into a reinforcing member 15 for the outer layer made from each of these cylindrical braided metal wire nets, and composite sheet members 21 were fabricated by setting the nip Δ1 between the cylindrical roller 16 and the roller 18 having the plurality of annular recessed grooves 17 on its outer peripheral surface along the axial direction to 0.40 mm, and by setting the nip Δ2 between the pair of cylindrical rollers 19 and 20 to 0.45 mm. With respect to these composite sheet members 21, the area ratio of the surface 41 of the reinforcing member 15 which is exposed together with the surface 52 of the heat-resistant material 14 on the surface 51 of the composite sheet member 21 was subjected to image measurement by using the image measurement camera CV-3000 made by Keyence Corporation. In addition, as for the arithmetic average roughness Ra of the one surface 51 of the composite sheet member 21 where the surface 41 of the reinforcing member 15 was exposed, measurements were taken of the surface roughness of 60 spots in the widthwise direction and the lengthwise direction of the composite sheet member 21, and the surface roughness is shown by their average values.

Figure 23:
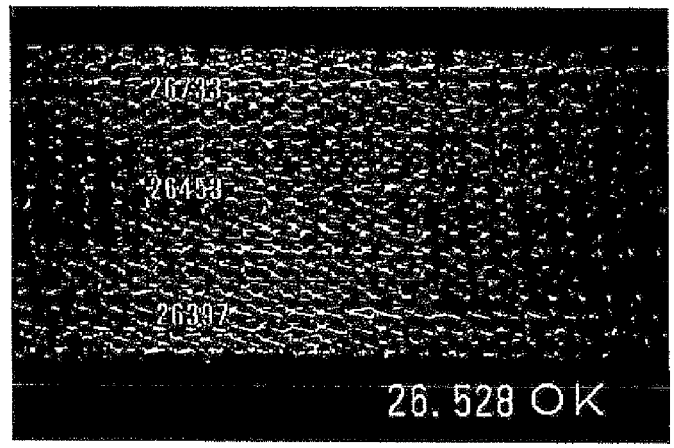
FIG. 23 is an image showing a ratio of an exposed area of the reinforcing member exposed on one surface of a composite sheet member.

FIG. 23 is an image measurement photograph of the composite sheet member 21 fabricated by using the cylindrical braided metal wire net fabricated by using the SUS 304 fine metal wire with the wire diameter of 0.15 mm and having the mesh size of 3.5 mm (vertical) and 1.5 mm (horizontal) and the heat-resistant sheet member 14 constituted of expanded graphite and having the density of 0.3 Mg/m$^3$ and the thickness of 1.5 mm. The ratio of the exposed area of the surface 41 of the reinforcing member 15 for the outer layer was 26.528%. Meanwhile, the arithmetic average roughness Ra of the surface 51 of the composite sheet member 21 was 8.34 μm.

Figure 24:
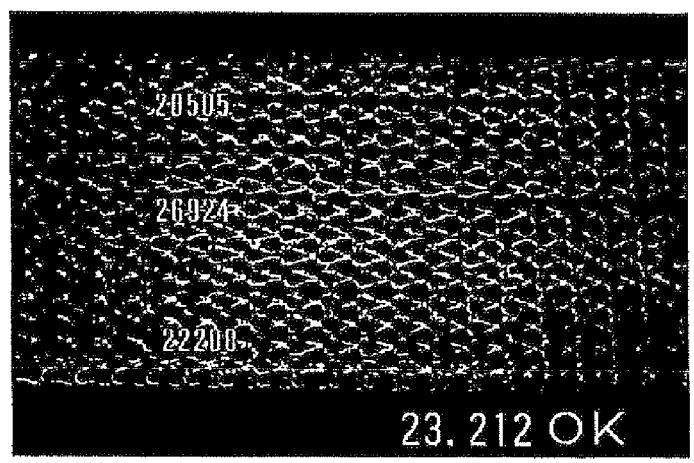
FIG. 24 is an image showing a ratio of an exposed area of the reinforcing member exposed on one surface of another composite sheet member.

FIG. 24 is an image measurement photograph of the composite sheet member 21 fabricated by using the cylindrical braided metal wire net fabricated by using the SUS 304 fine metal wire with the wire diameter of 0.28 mm and having the mesh size of 3.5 mm (vertical) and 1.5 mm (horizontal) and the heat-resistant sheet member 14 constituted of expanded graphite and having the density of 0.3 Mg/m$^3$ and the thickness of 1.5 mm. The ratio of the exposed area of the surface 41 of the reinforcing member 15 for the outer layer was 23.212%. Meanwhile, the arithmetic average roughness Ra of the surface 51 of the composite sheet member 21 was 10.82 μm.

In the case where the heat-resistant sheet member 14 for the outer layer having a density of 0.3 to 0.9 Mg/m$^3$ and a thickness of 1.30 to 1.50 mm was used and the reinforcing member 15 for the outer layer fabricated by using fine metal wires with a wire diameter of 0.15 to 0.28 mm was used, the ratio of the exposed area of the reinforcing member 15 on the one surface 51 of the composite sheet member 21 can be appropriately adjusted in a range of the area ratio of 5 to 35% by appropriately selecting the nip Δ1 between the cylindrical roller 16 and the roller 18 having the plurality of annular recessed grooves 17 on its outer peripheral surface along the axial direction in the range of 0.35 to 0.60 mm, and by setting the nip Δ2 between the pair of cylindrical rollers 19 and 20 in the range of 0.45 to 0.65 mm.

In addition, in the case where the heat-resistant sheet member 14 for the outer layer having a density of 0.3 to 0.9 Mg/m³ and a thickness of 1.30 to 1.50 mm was used and the reinforcing member 15 for the outer layer fabricated by using fine metal wires with a wire diameter of 0.15 to 0.175 mm was used, the ratio of the exposed area of the reinforcing member 15 on the one surface 51 of the composite sheet member 21 can be appropriately adjusted in a range of the area ratio of 5 to 35% by appropriately selecting the nip Δ1 between the pair of cylindrical rollers 16a and 18a in the range of 0.35 to 0.60 mm.

Figure 25:
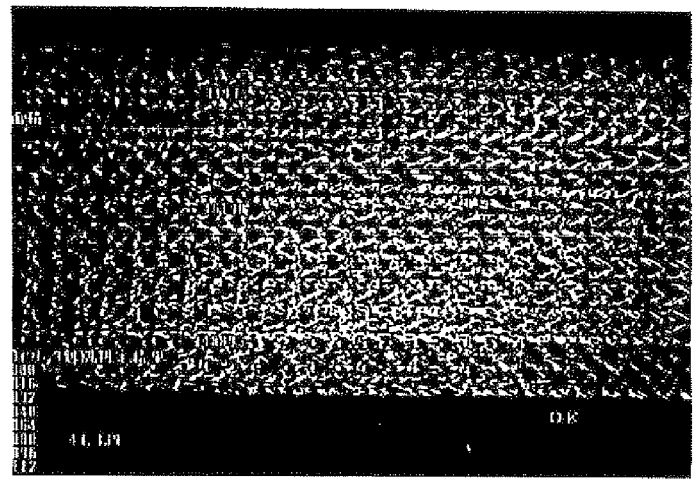
FIG. 25 is an image showing a ratio of an exposed area of the reinforcing member exposed on one surface of a composite sheet member fabricated by a conventional manufacturing method in accordance with a conventional art.

It should be noted that FIG. 25 is an image measurement photograph of a composite sheet member 21a fabricated by the method described in the above-described patent document 3 which is a conventional art. The method of manufacturing this composite sheet member 21a will be described with reference to FIGS. 26 to 29. Namely, by using an austenitic stainless steel wire with a wire diameter of 0.28 mm, a cylindrical braided metal wire net whose mesh size was 4 mm (vertical) and 3 mm (horizontal) was fabricated and was passed between the pair of rollers 2 and 3 to form a belt-shaped metal wire net 4 (see FIG. 3). The metal wire net thus formed was used as the reinforcing member 5 for the outer layer. A heat-resistant material containing 0.7 wt. % of phosphorus pentoxide, 4.0 wt. % of aluminum primary phosphate, and expanded graphite, and having a density of 1.12 Mg/m³ and a thickness of 0.4 mm was used as the heat-resistant material 6 for the outer layer.

Figure 26:
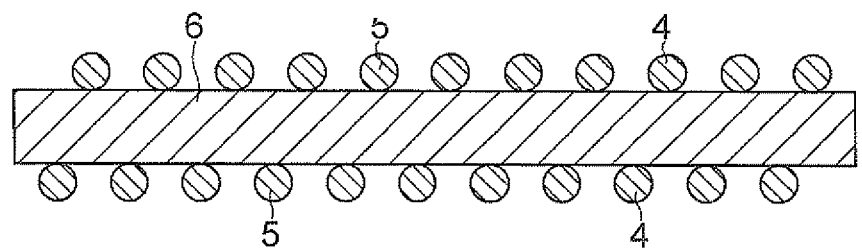
FIG. 26 is an explanatory diagram illustrating the process of manufacturing a composite sheet member in accordance with the conventional art.
Figure 27:
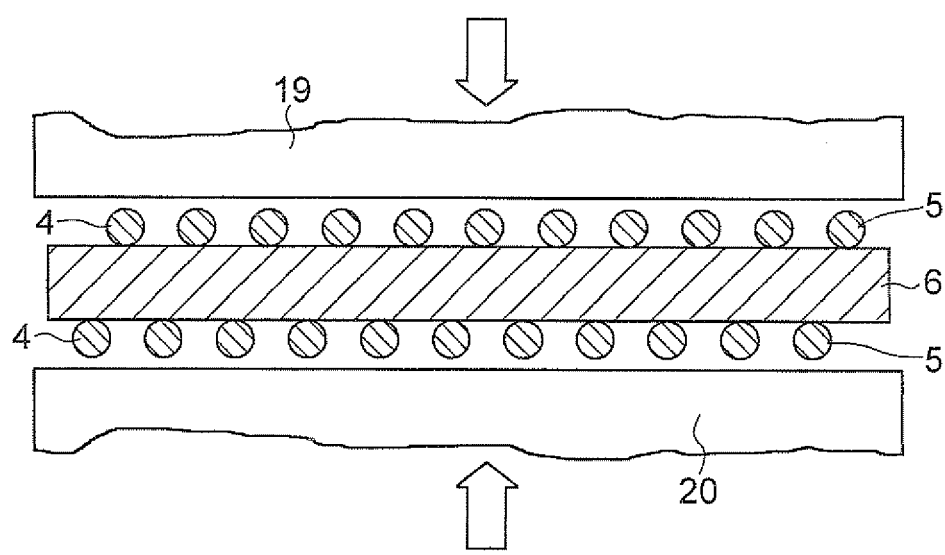
FIG. 27 is another explanatory diagram illustrating the process of manufacturing a composite sheet member in accordance with the conventional art.
Figure 28:
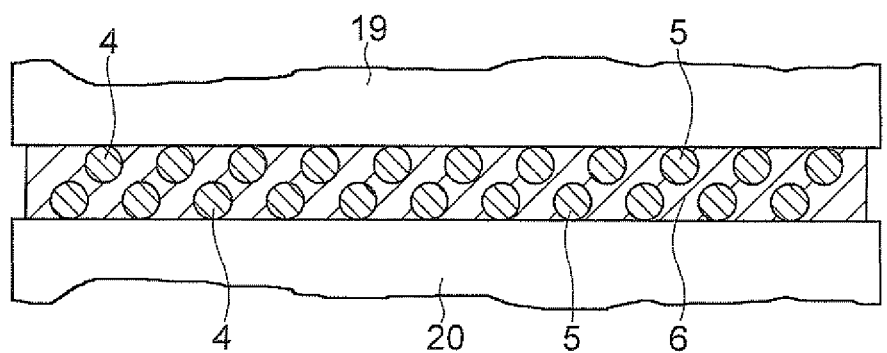
FIG. 28 is still another explanatory diagram illustrating the process of manufacturing a composite sheet member in accordance with the conventional art.
Figure 29:
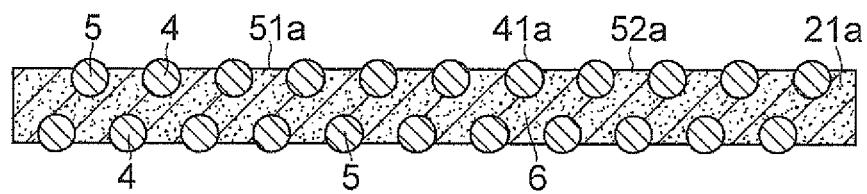
FIG. 29 is a further explanatory diagram illustrating the process of manufacturing a composite sheet member in accordance with the conventional art.

After a cylindrical braided metal wire net similar to the aforementioned reinforcing member 5 was separately fabricated, a belt-shaped metal wire net 4 fabricated by passing this cylindrical braided metal wire net between the rollers 2 and 3 was prepared, and the heat-resistant material 6 for the outer layer was inserted into that belt-shaped metal wire net 4 (see FIGS. 21 and 26). An assembly thereof was passed between the pair of cylindrical rollers 19 and 20 so as to be integrated (see FIGS. 26, 27, and 28), thereby fabricating the flat composite sheet member 21a in which the surface of the heat-resistant material 6 and the surface of the reinforcing member 5 were exposed (see FIG. 29). The area ratio of exposure of a surface 41a of the reinforcing member 5 in a surface 51a of that composite sheet member 21a was 43.339%, and the arithmetic average roughness Ra of the surface Ma of the composite sheet member 21a was 71.18 μm.

(Seventh Process) As the lubricating composition, one of the following is prepared: (1) an aqueous dispersion in which 60 wt. % of a lubricating composition composed of a PTFE powder is contained as a solid content; (2) an aqueous dispersion in which a hexagonal boron nitride powder and a boron oxide powder are dispersedly contained in an alumina sol in which hydrated alumina particles are dispersedly contained in water containing an acid as a dispersion medium, and which exhibits a hydrogen ion concentration (pH) of 2 to 3, the aqueous dispersion containing as a solid content 30 wt. % of a lubricating composition composed of 70 to 85 wt. % of hexagonal boron nitride, 1 to 10 wt. % of boron oxide, and 5 to 20 wt. % of hydrated alumina; and (3) an aqueous dispersion containing as a solid content a lubricating composition in which, in the aforementioned lubricating composition component composed of 70 to 85 wt. % of hexagonal boron nitride, 1 to 10 wt. % of boron oxide, and 5 to 20 wt. % of hydrated alumina, a PTFE powder is dispersedly contained by not more than 300 parts by weight or not more than 200 parts by weight, preferably 50 to 200 parts by weight or 50 to 150 parts by weight, with respect to 100 parts by weight of that lubricating composition component.

Figure 30:
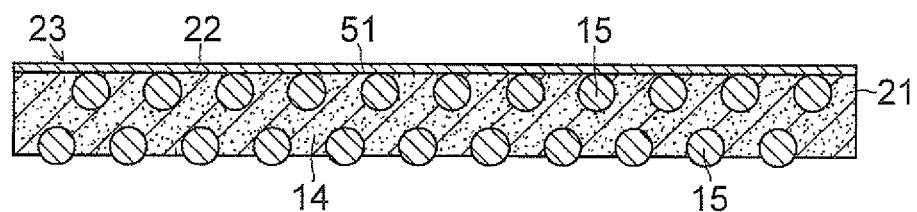
FIG. 30 is a diagram illustrating an outer layer forming member in the process of manufacturing the spherical annular seal member in accordance with the invention.

An aqueous dispersion (60 wt. % of PTFE and 40 wt. % of water) in which 60 wt. % of the lubricating composition of (1) above, i.e., a lubricating composition constituted of a PTFE powder, was dispersedly contained as a solid content was applied by brush coating to the surface 51 of the composite sheet member 21 fabricated by the above-described first, second, third, or fourth method, and was then allowed to dry, thereby forming an outer layer forming member 23 (see FIG. 30) in which a coating layer 22 constituted of that lubricating composition was formed.

Alternatively, an aqueous dispersion (35 to 42.5 wt. % of hexagonal boron nitride, 0.05 to 5 wt. % of boron oxide, 2.5 to 10 wt. % of hydrated alumina, and 70 wt. % of water) in which 30 wt. % of the lubricating composition of (2) above, i.e., a lubricating composition composed of 70 to 85 wt. % of hexagonal boron nitride, 0.1 to 10 wt. % of boron oxide, and 5 to 20 wt. % of hydrated alumina, was dispersedly contained as a solid content, was applied by brush coating to the surface 51 of the composite sheet member 21, and was then allowed to dry, thereby forming the outer layer forming member 23 in which the coating layer 22 constituted of that lubricating composition was formed.

Still alternatively, an aqueous dispersion in which 35 to 50 wt. % of the lubricating composition of (3) above, i.e., a lubricating composition composed of 17.5 to 56.7 wt. % of hexagonal boron nitride, 0.025 to 6.7 wt. % of boron oxide, 1.25 to 13.3 wt. % of hydrated alumina, and 33.3 to 75 wt. % of PTFE, was dispersedly contained as a solid content, was applied by brush coating to the surface 51 of the composite sheet member 21, and was then allowed to dry, thereby forming the outer layer forming member 23 in which the coating layer 22 constituted of that lubricating composition was formed.

In the above-described lubricating compositions (2) and (3), as the hydrated alumina, at least one of the following is used: alumina monohydrate (aluminum hydroxide oxide) such as boehmite ($Al_2O_3.H_2O$) and diaspore ($Al_2O_3.H_2O$), alumina trihydrate such as gibbsite ($Al_2O_3.3H_2O$) and bayerite ($Al_2O_3.3H_2O$), pseudoboehmite, and the like.

Figure 31:
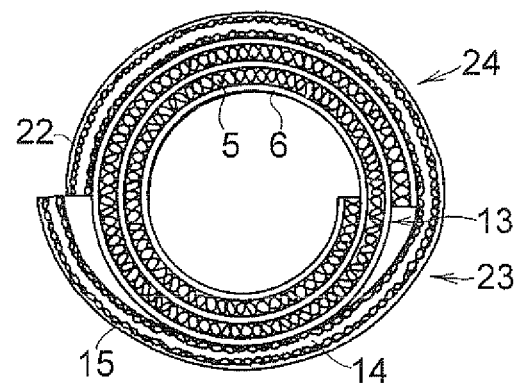
FIG. 31 is a plan view of a cylindrical preform in the process of manufacturing the spherical annular seal member in accordance with the invention.

(Eighth Process) The outer layer forming member 23 thus obtained is wound around the outer peripheral surface of the tubular base member 13 with the coating layer 22 placed on the outer side, thereby fabricating a cylindrical preform 24 (see FIG. 31).

Figure 32:
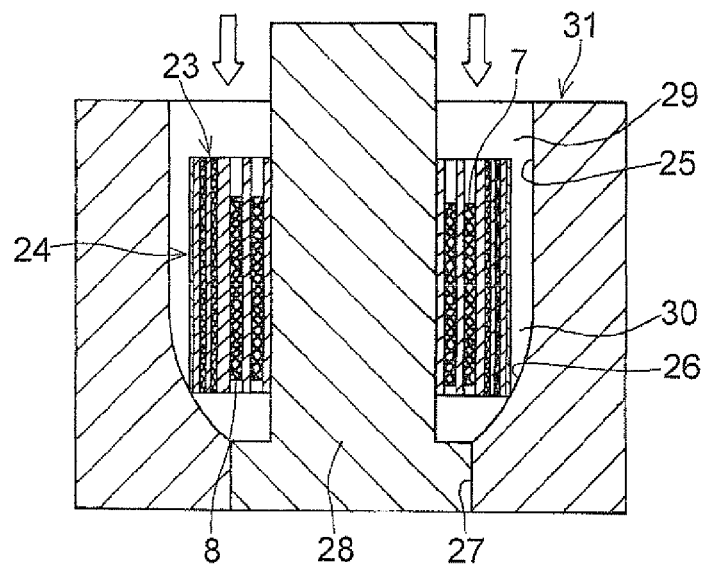
FIG. 32 is a vertical cross-sectional view illustrating a state in which the cylindrical preform is inserted in a die in the process of manufacturing the spherical annular seal member in accordance with the invention.

(Ninth Process) A die 31 such as the one shown in FIG. 32 is prepared which has on its inner surface a cylindrical inner wall surface 25, a partially convex spherical surface 26 continuing from the cylindrical inner wall surface 25, and a through hole 27 continuing from the partially convex spherical surface 26, and in which a hollow cylindrical portion 29 and a spherical annular hollow portion 30 continuing from that hollow cylindrical portion 29 are formed inside it as a stepped core 28 is inserted in the through hole 27. Then, the cylindrical preform 24 is fitted over the stepped core 28 of the die 31.

Figure 2:
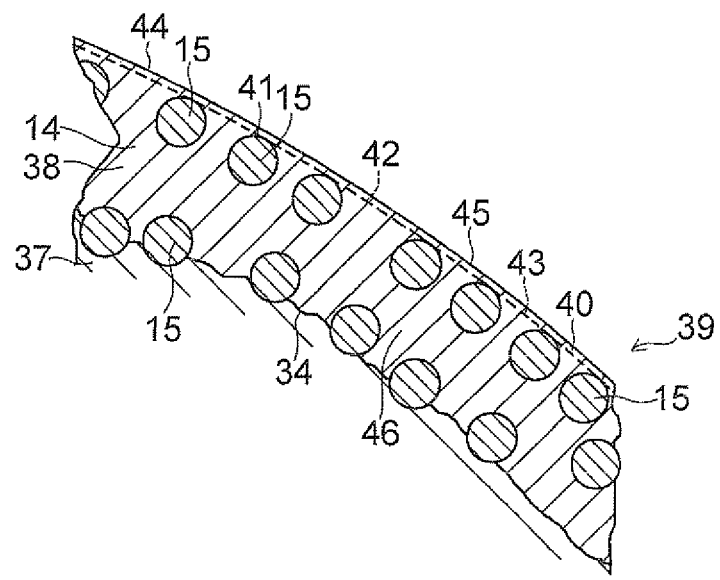
FIG. 2 is a partially enlarged explanatory view of the spherical annular seal member shown in FIG. 1.

The cylindrical preform 24 disposed in the hollow cylindrical portion 29 and the spherical annular hollow portion 30 of the die 31 is subjected to compression forming under a pressure of 98 to 392 N/mm² (1 to 4 tons/cm²) in the direction of the core axis. Thus, as shown in FIGS. 1 and 2, a spherical annular seal member 39 is fabricated which includes a spherical annular base member 37 having a through hole 32 in its central portion and defined by a cylindrical inner surface 33, a partially convex spherical surface 34, and the large- and small-diameter-side annular end faces 35 and 36 of the partially convex spherical surface 34, as well as an outer layer 38 formed integrally on the partially convex spherical surface 34 of the spherical annular base member 37.

Through this compression forming, the spherical annular base member 37 is constructed so as to be provided with structural integrity as the heat-resistant material 6 for the spherical annular base member and the reinforcing member 5 for the spherical annular base member are compressed and intertwined with each other. An obverse surface 44 of the outer layer 38 is constituted of a smooth surface 45 of a sliding layer 40 of the lubricating composition adherently formed integrally on the outer layer intermediate surface 42 consisting of a surface 43 of the heat-resistant material 14 for the outer layer and the surface 41 of the reinforcing member 15 for the outer layer which is flush with the surface 43 of the heat-resistant material 14.

If, in the fourth process, the tubular base member is formed by spirally convoluting the superposed assembly 12 with the reinforcing member 5 made from the belt-shaped metal wire net 4 placed on the inner side instead of spirally convoluting it with the heat-resistant material 6 placed on the inner side, it is possible to fabricate the spherical annular seal member 39 in which the reinforcing member 5 made from the metal wire net of the spherical annular base member 37 is exposed on the cylindrical inner surface 33. In this spherical annular seal member 39 in which the reinforcing member 5 made from the metal wire net is exposed on the cylindrical inner surface 33, the fitting force at the time of being press fitted to the outer peripheral surface of the exhaust pipe becomes strong, and this spherical annular seal member 39 is firmly secured to the outer peripheral surface of the exhaust pipe.

The fabricated spherical annular seal member 39 is comprised of the spherical annular base member 37 defined by the cylindrical inner surface 33, the partially convex spherical surface 34, and the large- and small-diameter-side annular end faces 35 and 36 of the partially convex spherical surface 34, as well as the outer layer 38 formed integrally on the partially convex spherical surface 34 of the spherical annular base member 37. The spherical annular base member 37 includes the reinforcing member 5 made from a metal wire net and the heat-resistant material 6 containing expanded graphite, filling meshes of the metal wire net of the reinforcing member 5, and compressed in such a manner as to be formed integrally with the reinforcing member 5 in mixed form. The outer layer 38 includes a base layer 46 and the sliding layer 40 of the lubricating composition adherently formed integrally on the base layer 46 at the outer layer intermediate surface 42. The base layer 46 includes the reinforcing member 15 made from a metal wire net and compressed and the heat-resistant material 14 constituted of expanded graphite, filling the meshes of the metal wire net of the reinforcing member 15, and compressed so as to be closely press bonded to the reinforcing member 15 and to have the surface 43 flush with the surface 41 of that reinforcing member 15 and forming the outer layer intermediate surface 42 together with that surface 41, the base layer 46 being formed integrally with the partially convex spherical surface 34. In the outer layer intermediate surface 42 of the base layer 46 formed by the reinforcing member 15 and the heat-resistant material 14 in that outer layer 38, that reinforcing member 15 is present in a scattered manner with an area ratio of 5 to 35%, the surface roughness of the outer layer intermediate surface 42 is formed with 5 to 30 µm in the arithmetic average roughness Ra, and the obverse surface 44 of the outer layer 38 exposed to the outside is constituted of the smooth surface 45 of the sliding layer 40.

Figure 33:
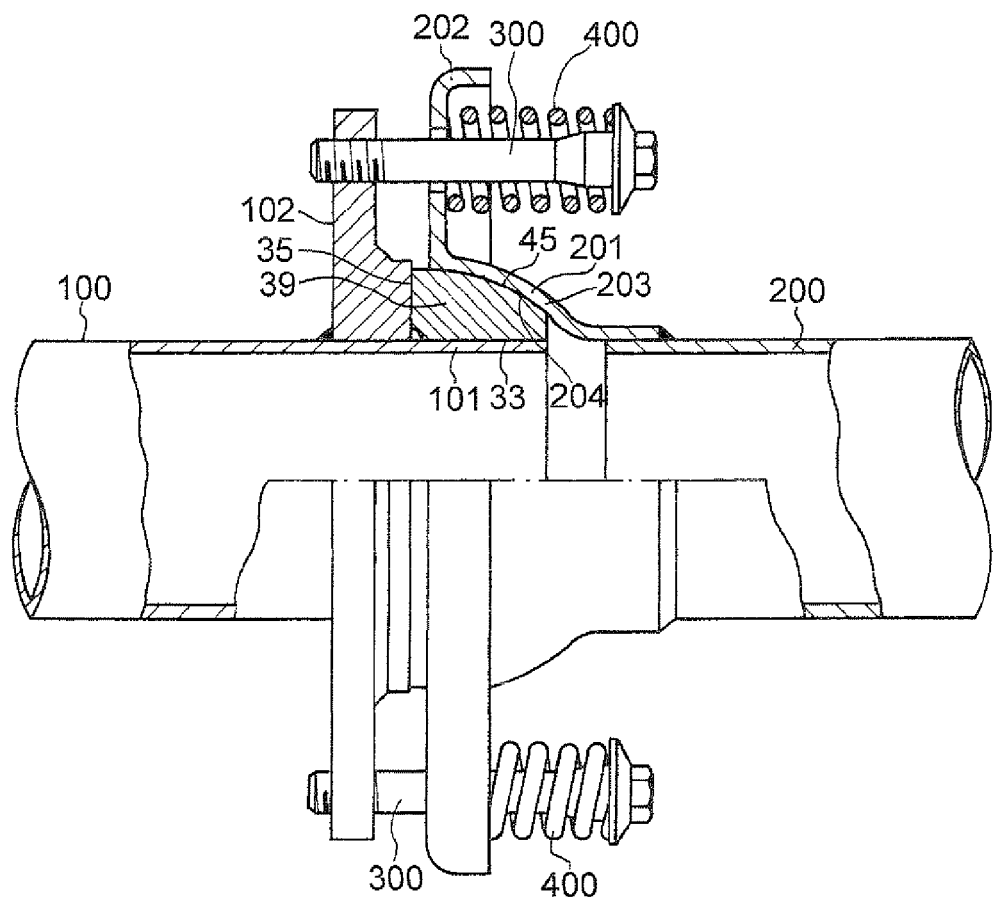
FIG. 33 is a vertical cross-sectional view of an exhaust pipe spherical joint with the spherical annular seal member in accordance with the invention incorporated therein.
Figure 34:
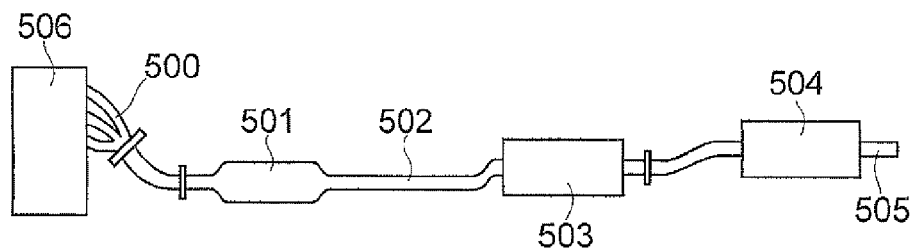
FIG. 34 is an explanatory diagram of an exhaust system of an engine.
Figure 35:
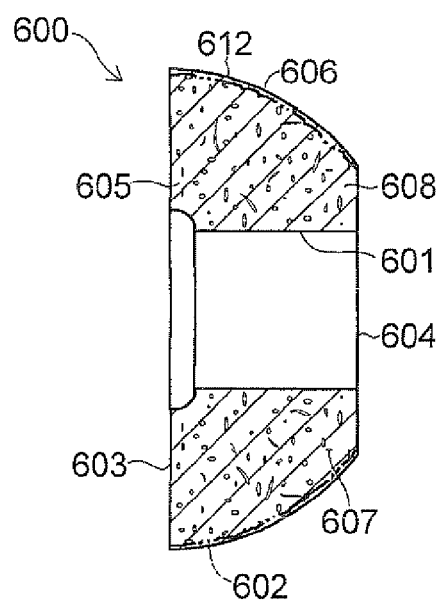
FIG. 35 is an explanatory diagram of a conventional spherical annular seal member.
Figure 36:
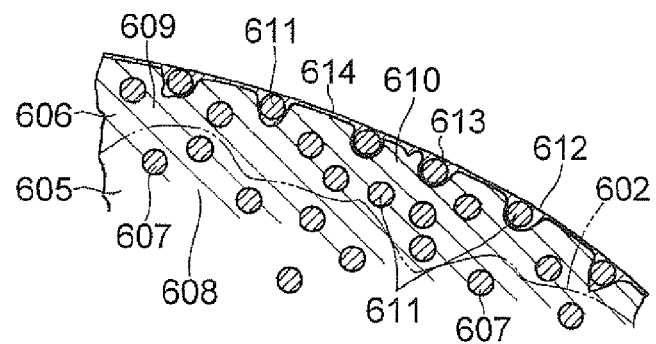
FIG. 36 is another explanatory diagram of the conventional spherical annular seal member.

The spherical annular seal member 39 is used by being incorporated in the exhaust pipe spherical joint shown in FIG. 33. That is, in the exhaust pipe spherical joint shown in FIG. 33, a flange 102 is provided uprightly on an outer peripheral surface of an upstream-side exhaust pipe 100, which is connected to an engine side, by leaving a pipe end 101. The spherical annular seal member 39 is fitted over the pipe end 101 at the cylindrical inner surface 33 defining the through hole 32, and is seated with its large-diameter-side annular end face 35 abutting against the flange 102. A flared portion 203, which integrally has a concave spherical surface portion 201 and a flange portion 202 connected to the concave spherical surface portion 201, is secured to a downstream-side exhaust pipe 200 which is disposed in face-to-face relation to the upstream-side exhaust pipe 100 and is connected to a muffler side. An inner surface 204 of the concave spherical surface portion 201 is in slidable contact with the smooth surface 45 of the sliding layer 40 in the outer layer 38 of the spherical annular seal member 39.

In the exhaust pipe spherical joint shown in FIG. 33, the downstream-side exhaust pipe 200 is constantly urged resiliently toward the upstream-side exhaust pipe 100 by means of a pair of bolts 300 each having one end fixed to the flange 102 and another end arranged by being inserted in the flange portion 202 of the flared portion 203, and by means of a pair of coil springs 400 each arranged between an enlarged head of the bolt 300 and the flange portion 202. The exhaust pipe spherical joint is arranged such that relative angular displacements occurring in the upstream- and downstream-side exhaust pipes 100 and 200 are allowed by sliding contact between the smooth surface 45 of the outer layer 38 of the spherical annular seal member 39 and the inner surface 204 of the concave spherical surface portion 201 of the flared portion 203 formed at the end of the downstream-side exhaust pipe 200.

EXAMPLES

Next, a detailed description will be given of the invention on the basis of examples. It should be noted that the invention is not limited by these examples.

Example 1

By using one austenitic stainless steel wire (SUS 304) having a wire diameter of 0.28 mm as a fine metal wire, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant material, an expanded graphite sheet having a density of 1.12 $Mg/m^3$ and a thickness of 0.4 mm was used. After the heat-resistant material was spirally convoluted by a one-circumference portion, the reinforcing member for the spherical annular base member was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet having a density of 0.3 Mg/m$^3$ and a thickness of 1.35 mm was used. As the reinforcing member for the outer layer, by using an austenitic stainless steel wire (SUS 304) with a wire diameter of 0.28 mm, which was similar to that of the aforementioned reinforcing member for the spherical annular base member, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. The reinforcing member with the heat-resistant material inserted therein, starting with its insertion-starting end side of that heat-resistant material, was fed into a nip (the nip Δ1 was set to 0.50 mm) between a cylindrical roller and a roller having a plurality of annular recessed grooves on its outer peripheral surface along the axial direction, and was thereby pressurized in the thicknesswise direction of that heat-resistant material. The reinforcing member with the heat-resistant material inserted therein was further fed into a nip (the nip Δ2 was set to 0.45 mm) between another pair of cylindrical rollers and was thereby pressurized. Thus, a flat composite sheet member was formed in which the heat-resistant material for the outer layer and the reinforcing member were press bonded to each other such that the heat-resistant material for the outer layer was densely filled in the meshes of the metal wire net of the reinforcing member, and the reinforcing member was embedded in that heat-resistant material for the outer layer, thereby forming the surface of the heat-resistant material for the outer layer and the surface of the reinforcing member flush with each other and allowing the surface of that reinforcing member and the surface of the heat-resistant material for the outer layer to be exposed in a scattered manner. In this composite sheet member, the area ratio of exposure of the surface of the reinforcing member together with the surface of the heat-resistant material on the one surface of the composite sheet member was 26.4%, and the arithmetic average roughness Ra of that surface was 19.3 μm.

As a lubricating composition, an alumina sol was prepared in which boehmite (alumina monohydrate: $Al_2O_3 \cdot H_2O$) as hydrated alumina was dispersedly contained in water serving as a dispersion medium containing nitric acid acting as a deflocculant, and which exhibited a hydrogen ion concentration (pH) of 2. An aqueous dispersion A (24.9 wt. % of hexagonal boron nitride, 1.2 wt. % of boron oxide, 3.9 wt. % of boehmite, and 70 wt. % of water and nitric acid) was then prepared which was an aqueous dispersion with a hexagonal boron nitride powder and a boron oxide powder dispersedly contained in this alumina sol, and in which 30 wt. % of a lubricating composition containing 83 wt. % of hexagonal boron nitride, 4 wt. % of boron oxide, and 13 wt. % of boehmite was dispersedly contained as a solid content.

The above-described aqueous dispersion A was applied by brush coating to that surface of the aforementioned composite sheet member which was pressurized by the aforementioned roller having the annular recessed grooves and was allowed to dry, to thereby fabricate an outer layer forming member in which a coating layer (83 wt. % of hexagonal boron nitride, 4 wt. % of boron oxide, and 13 wt. % of boehmite) of the solid lubricant constituted of the lubricating composition was formed on the surface of that composite sheet member.

The above-described outer layer forming member was wound around the outer peripheral surface of the aforementioned tubular base member with the coating layer placed on the outer side, thereby fabricating the cylindrical preform. This cylindrical preform was fitted over the stepped core of the die shown in FIG. 32, and was placed in the hollow portion of the die.

The cylindrical preform disposed in the hollow portion of the die was subjected to compression forming under a pressure of 294 N/mm$^2$ (3 tons/cm$^2$) in the direction of the core axis. Thus, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 83 wt. % of hexagonal boron nitride, 4 wt. % of boron oxide, and 13 wt. % of boehmite and adherently formed integrally on the base layer at the outer layer intermediate surface consisting of the surface of the heat-resistant material for the outer layer and the surface of the reinforcing member for the outer layer which was flush with the surface of that heat-resistant material.

Example 2

By using constituent materials similar to those of the above-described Example 1, the tubular base member was fabricated in the same way as in Example 1. In this tubular base member, widthwise opposite end portions of the heat-resistant material respectively projected (jutted out) from the reinforcing member in the widthwise direction.

As the heat-resistant material for the outer layer, an expanded graphite sheet similar to that of the above-described Example 1 was used. As the reinforcing member for the outer layer, by using an austenitic stainless steel wire (SUS 304) with a wire diameter of 0.175 mm, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. In the same way as in the above-described Example 1, the reinforcing member with the heat-resistant material inserted therein, starting with its insertion-starting end side of that heat-resistant material, was fed into a nip (the nip Δ1 was set to 0.50 mm) between the cylindrical roller and the roller having the plurality of annular recessed grooves on its outer peripheral surface along the axial direction, and was thereby pressurized in the thicknesswise direction of that heat-resistant material. The reinforcing member with the heat-resistant material inserted therein was further fed into a nip (the nip Δ2 was set to 0.45 mm) between another pair of cylindrical rollers and was thereby pressurized. Thus, a flat composite sheet member was formed in which the heat-resistant material for the outer layer and the reinforcing member were press bonded to each other such that the heat-resistant material for the outer layer was densely filled in the meshes of the metal wire net of the reinforcing member, and the reinforcing member was embedded in that heat-resistant material for the outer layer, thereby forming the surface of the heat-resistant material for the outer layer and the surface of the reinforcing member flush with each other and allowing the surface of that reinforcing member and the surface of the heat-resistant material for the outer layer to be exposed in a scattered manner. In this composite sheet member, the area ratio of exposure of the surface of the reinforcing member together with the surface of the heat-resistant material on the one surface of the composite sheet member was 23.7%, and the arithmetic average roughness Ra of that surface was 12.6 µm.

As a lubricating composition, an aqueous dispersion A (24.9 wt. % of hexagonal boron nitride, 1.2 wt. % of boron oxide, 3.9 wt. % of boehmite, and 70 wt. % of water and nitric acid) was used, and this aqueous dispersion A was applied by brush coating to that surface of the aforementioned composite sheet member which was pressurized by the aforementioned roller having the annular recessed grooves and was allowed to dry, to thereby fabricate an outer layer forming member in which a coating layer (83 wt. % of hexagonal boron nitride, 4 wt. % of boron oxide, and 13 wt. % of boehmite) of the solid lubricant constituted of the lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 83 wt. % of hexagonal boron nitride, 4 wt. % of boron oxide, and 13 wt. % of boehmite and adherently formed integrally on the base layer at the outer layer intermediate surface consisting of the surface of the heat-resistant material for the outer layer and the surface of the reinforcing member for the outer layer which was flush with the surface of that heat-resistant material.

Example 3

By using constituent materials similar to those of the above-described Example 1, the tubular base member was fabricated in the same way as in Example 1. In this tubular base member, widthwise opposite end portions of the heat-resistant material respectively projected (jutted out) from the reinforcing member in the widthwise direction.

As the heat-resistant material for the outer layer, an expanded graphite sheet similar to that of the above-described Example 1 was used. As the reinforcing member for the outer layer, by using an austenitic stainless steel wire (SUS 304) with a wire diameter of 0.15 mm, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. In the same way as in the above-described Example 1, the reinforcing member with the heat-resistant material inserted therein, starting with its insertion-starting end side of that heat-resistant material, was fed into a nip (the nip $\Delta 1$ was set to 0.50 mm) between the cylindrical roller and the roller having the plurality of annular recessed grooves on its outer peripheral surface along the axial direction, and was thereby pressurized in the thicknesswise direction of that heat-resistant material. The reinforcing member with the heat-resistant material inserted therein was further fed into a nip (the nip $\Delta 2$ was set to 0.45 mm) between another pair of cylindrical rollers and was thereby pressurized. Thus, a flat composite sheet member was formed in which the heat-resistant material for the outer layer and the reinforcing member were press bonded to each other such that the heat-resistant material for the outer layer was densely filled in the meshes of the metal wire net of the reinforcing member, and the reinforcing member was embedded in that heat-resistant material for the outer layer, thereby forming the surface of the heat-resistant material for the outer layer and the surface of the reinforcing member flush with each other and allowing the surface of that reinforcing member and the surface of the heat-resistant material for the outer layer to be exposed in a scattered manner. In this composite sheet member, the area ratio of exposure of the surface of the reinforcing member together with the surface of the heat-resistant material on the one surface of the composite sheet member was 20.4%, and the arithmetic average roughness Ra of that surface was 8.34 µm.

As a lubricating composition, an aqueous dispersion A (24.9 wt. % of hexagonal boron nitride, 1.2 wt. % of boron oxide, 3.9 wt. % of boehmite, and 70 wt. % of water and nitric acid) was used, and this aqueous dispersion A was applied by brush coating to that surface of the aforementioned composite sheet member which was pressurized by the aforementioned roller having the annular recessed grooves and was allowed to dry, to thereby fabricate an outer layer forming member in which a coating layer (83 wt. % of hexagonal boron nitride, 4 wt. % of boron oxide, and 13 wt. % of boehmite) of the solid lubricant constituted of the lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 83 wt. % of hexagonal boron nitride, 4 wt. % of boron oxide, and 13 wt. % of boehmite and adherently formed integrally on the base layer at the outer layer intermediate surface consisting of the surface of the heat-resistant material for the outer layer and the surface of the reinforcing member for the outer layer which was flush with the surface of that heat-resistant material.

Example 4

By using constituent materials similar to those of the above-described Example 1, the tubular base member was fabricated in the same way as in Example 1. In this tubular base member, widthwise opposite end portions of the heat-resistant material respectively projected (jutted out) from the reinforcing member in the widthwise direction.

A composite sheet member was fabricated by using similar constituent materials and a similar method to those of the above-described Example 1. In this composite sheet member, the area ratio of exposure of the surface of the reinforcing member together with the surface of the heat-resistant material on the one surface of the composite sheet member was 26.2%, and the arithmetic average roughness Ra of that surface was 19.1 μm.

As a lubricating composition, an aqueous dispersion B (60 wt. % of PTFE and 40 wt. % of water and a surface active agent) was prepared in which 60 wt. % of a lubricating composition constituted of a PTFE powder was dispersedly contained as a solid content. This aqueous dispersion B was applied by brush coating to that surface of the aforementioned composite sheet member which was pressurized by the aforementioned roller having the annular recessed grooves and was allowed to dry, to thereby fabricate an outer layer forming member in which a coating layer (100 wt. % of PTFE) of the solid lubricant constituted of the lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 100 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 5

By using constituent materials similar to those of the above-described Example 1, the tubular base member was fabricated in the same way as in Example 1. In this tubular base member, widthwise opposite end portions of the heat-resistant material respectively projected (jutted out) from the reinforcing member in the widthwise direction.

As the heat-resistant material for the outer layer, an expanded graphite sheet with a density of 0.3 Mg/m$^3$ and a thickness of 1.35 mm, which was similar to that of the above-described Example 1, was used. As the reinforcing member for the outer layer, by using an austenitic stainless steel wire with a wire diameter of 0.15 mm, which was similar to that of the above-described Example 3, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. The reinforcing member with the heat-resistant material inserted therein, starting with its insertion-starting end side of that heat-resistant material, was fed into a nip (the nip Δ1 was set to 0.45 mm) between a pair of cylindrical rollers having smooth cylindrical outer peripheral surfaces, and was thereby pressurized in the thicknesswise direction of that heat-resistant material. Thus, a flat composite sheet member was formed in which the heat-resistant material for the outer layer and the reinforcing member were press bonded to each other such that the heat-resistant material for the outer layer was densely filled in the meshes of the metal wire net of the reinforcing member, and the reinforcing member was embedded in that heat-resistant material for the outer layer, thereby forming the surface of the heat-resistant material for the outer layer and the surface of the reinforcing member for the outer layer flush with each other and allowing the surface of that reinforcing member and the surface of the heat-resistant material to be exposed. In this composite sheet member, the area ratio of exposure of the surface of the reinforcing member together with the surface of the heat-resistant material on the one surface of the composite sheet member was 20.2%, and the arithmetic average roughness Ra of that surface was 8.28 μm.

As a lubricating composition, an aqueous dispersion B (60 wt. % of PTFE and 40 wt. % of water and a surface active agent) similar to that of the above-described Example 4 was used. This aqueous dispersion B was applied by brush coating to one surface of the aforementioned composite sheet member and was allowed to dry, to thereby fabricate an outer layer forming member in which a coating layer (100 wt. % of PTFE) of the solid lubricant constituted of the lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 100 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 6

A reinforcing member for the spherical annular base member similar to that of the above-described Example 1 was used. As the heat-resistant material for the spherical annular base member, an expanded graphite sheet containing 4.0 wt. % of aluminum primary phosphate and expanded graphite and having a density of 1.12 Mg/m$^3$ and a thickness of 0.4 mm was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet containing 4.0 wt. % of aluminum primary phosphate and expanded graphite and having a density of 0.3 Mg/m$^3$ and a thickness of 1.35 mm was used. As the reinforcing member for the outer layer, by using an austenitic stainless steel wire (SUS 304) with a wire diameter of 0.28 mm, which was similar to that of the above-described Example 1, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. Thereafter, in a method similar to that of the above-described Example 1, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 26.6%, and the arithmetic average roughness Ra of that surface was 19.6 µm.

As a lubricating composition, the aqueous dispersion A (24.9 wt. % of hexagonal boron nitride, 1.2 wt. % of boron oxide, 3.9 wt. % of boehmite, and 70 wt. % of water and nitric acid) used in the above-described Example 1 and the aqueous dispersion B (60 wt. % of PTFE and 40 wt. % of water and a surface active agent) used in the above-described Example 4 were prepared. These aqueous dispersions A and B were mixed at a ratio of A:B=70:30, to thereby prepare an aqueous dispersion C (17.43 wt. % of hexagonal boron nitride, 0.84 wt. % of boron oxide, 2.73 wt. % of boehmite, 18 wt. % of PTFE, and 61 wt. % of water, nitric acid, and a surface active agent) in which 39 wt. % of a lubricating composition containing 44.7 wt. % of hexagonal boron nitride, 2.1 wt. % of boron oxide, 7 wt. % of boehmite, and 46.2 wt. % of PTFE was dispersedly contained as a solid content.

The above-described aqueous dispersion C was applied by brush coating to one surface of the aforementioned composite sheet member and was allowed to dry, to thereby form an outer layer forming member in which a coating layer (44.7 wt. % of hexagonal boron nitride, 2.1 wt. % of boron oxide, 7 wt. % of boehmite, and 46.2 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 44.7 wt. % of hexagonal boron nitride, 2.1 wt. % of boron oxide, 7 wt. % of boehmite, and 46.2 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 7

A reinforcing member for the spherical annular base member similar to that of the above-described Example 1 was used. As the heat-resistant material for the spherical annular base member, an expanded graphite sheet similar to that of the above-described Example 6, i.e., one containing 4.0 wt. % of aluminum primary phosphate and expanded graphite and having a density of 1.12 Mg/m$^3$ and a thickness of 0.4 mm, was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 6 was used. As the reinforcing member for the outer layer, by using an austenitic stainless steel wire (SUS 304) with a wire diameter of 0.15 mm, which was similar to that of the above-described Example 3, a cylindrical braided metal wire net whose mesh size was 3.5 mm (vertical) and 2.5 mm (horizontal) was continuously knitted, and the heat-resistant material for the outer layer was continuously inserted into the inner side of that cylindrical braided metal wire net. Thereafter, in a method similar to that of the above-described Example 5, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 20.4%, and the arithmetic average roughness Ra of that surface was 8.32 μm.

As a lubricating composition, an aqueous dispersion C similar to that of the above-described Example 6 was used. This aqueous dispersion C was applied by brush coating to one surface of the aforementioned composite sheet member and was allowed to dry, to thereby form an outer layer forming member in which a coating layer (44.7 wt. % of hexagonal boron nitride, 2.1 wt. % of boron oxide, 7 wt. % of boehmite, and 46.2 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 44.7 wt. % of hexagonal boron nitride, 2.1 wt. % of boron oxide, 7 wt. % of boehmite, and 46.2 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 8

A reinforcing member for the spherical annular base member similar to that of the above-described Example 1 was used. As the heat-resistant material for the spherical annular base member, an expanded graphite sheet containing 0.7 wt. % of phosphorus pentoxide, 4.0 wt. % of aluminum primary phosphate, and expanded graphite and having a density of 1.12 Mg/m$^3$ and a thickness of 0.4 mm was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet containing 0.7 wt. % of phosphorus pentoxide, 4.0 wt. % of aluminum primary phosphate, and expanded graphite and having a density of 0.3 Mg/m$^3$ and a thickness of 1.35 mm was used. As the reinforcing member for the outer layer, a reinforcing member for the outer layer similar to that of the above-described Example 1 was used. Thereafter, in a method similar to that of the above-described Example 1, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 26.6%, and the arithmetic average roughness Ra of that surface was 19.6 μm.

As a lubricating composition, the aqueous dispersion A (24.9 wt. % of hexagonal boron nitride, 1.2 wt. % of boron oxide, 3.9 wt. % of boehmite, and 70 wt. % of water and nitric acid) used in the above-described Example 1 and the aqueous dispersion B (60 wt. % of PTFE and 40 wt. % of water and a surface active agent) used in the above-described Example 4 were prepared. These aqueous dispersions A and B were mixed at a ratio of A:B=65.5:34.5, to thereby prepare an aqueous dispersion D (16.3 wt. % of hexagonal boron nitride, 0.8 wt. % of boron oxide, 2.5 wt. % of boehmite, 20.7 wt. % of PTFE, and 59.7 wt. % of water, nitric acid, and a surface active agent) in which 40.3 wt. % of a lubricating composition Containing 40.4 wt. % of hexagonal boron nitride, 2 wt. % of boron oxide, 6.2 wt. % of boehmite, and 51.4 wt. % of PTFE was dispersedly contained as a solid content.

The above-described aqueous dispersion D was applied by brush coating to that surface of the aforementioned composite sheet member which was pressurized by the aforementioned roller having the annular recessed grooves. This aqueous dispersion D was allowed to dry, to thereby form an outer layer forming member in which a coating layer (40.4 wt. % of hexagonal boron nitride, 2 wt. % of boron oxide, 6.2 wt. % of boehmite, and 51.4 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 40.4 wt. % of hexagonal boron nitride, 2 wt. % of boron oxide, 6.2 wt. % of boehmite, and 51.4 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 9

A reinforcing member for the spherical annular base member similar to that of the above-described Example 1 was used. As the heat-resistant material for the spherical annular base member, an expanded graphite sheet similar to that of the above-described Example 8 was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 8 was used. As the reinforcing member for the outer layer, a reinforcing member for the outer layer similar to that of the above-described Example 3 was used. In a method similar to that of the above-described Example 5, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 20.6%, and the arithmetic average roughness Ra of that surface was 8.6 μm.

As a lubricating composition, an aqueous dispersion D used in the above-described Example 8 was used. This aqueous dispersion D was applied by brush coating to one surface of the aforementioned composite sheet member and was allowed to dry, to thereby form an outer layer forming member in which a coating layer (40.4 wt. % of hexagonal boron nitride, 2 wt. % of boron oxide, 6.2 wt. % of boehmite, and 51.4 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 40.4 wt. % of hexagonal boron nitride, 2 wt. % of boron oxide, 6.2 wt. % of boehmite, and 51.4 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 10

A reinforcing member for the spherical annular base member similar to that of the above-described Example 1 was used. As the heat-resistant material for the spherical annular base member, an expanded graphite sheet similar to that of the above-described Example 8 was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 8 was used. As the reinforcing member for the outer layer, a reinforcing member for the outer layer similar to that of the above-described Example 1 was used. In a method similar to that of the above-described Example 1, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 26.4%, and the arithmetic average roughness Ra of that surface was 19.2 µm.

As a lubricating composition, the aqueous dispersion A (24.9 wt. % of hexagonal boron nitride, 1.2 wt. % of boron oxide, 3.9 wt. % of boehmite, and 70 wt. % of water and nitric acid) used in the above-described Example 1 and the aqueous dispersion B (60 wt. % of PTFE and 40 wt. % of water and a surface active agent) used in the above-described Example 4 were prepared. These aqueous dispersions A and B were mixed at a ratio of A:B=50:50, to thereby prepare an aqueous dispersion E (12.45 wt. % of hexagonal boron nitride, 0.6 wt. % of boron oxide, 1.95 wt. % of boehmite, 30 wt. % of PTFE, and 55 wt. % of water, nitric acid, and a surface active agent) in which, 45 wt. % of a lubricating composition containing 27.7 wt. % of hexagonal boron nitride, 1.3 wt. % of boron oxide, 4.3 wt. % of boehmite, and 66.7 wt. % of PTFE was dispersedly contained as a solid content.

The above-described aqueous dispersion E was applied by brush coating to that surface of the aforementioned composite sheet member which was pressurized by the aforementioned roller having the annular recessed grooves. This aqueous dispersion D was allowed to dry, to thereby form an outer layer forming member in which a coating layer (27.7 wt. % of hexagonal boron nitride, 1.3 wt. % of boron oxide, 4.3 wt. % of boehmite, and 66.7 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal, wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 27.7 wt. % of hexagonal boron nitride, 1.3 wt. % of boron oxide, 4.3 wt. % of boehmite, and 66.7 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 11

A reinforcing member for the spherical annular base member similar to that of the above-described Example 1 was used. As the heat-resistant material for the spherical annular base member, an expanded graphite sheet similar to that of the above-described Example 8 was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 8 was used. As the reinforcing member for the outer layer, a reinforcing member for the outer layer similar to that of the above-described Example 3 was used. Thereafter, in a method similar to that of the above-described Example 5, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 20.3%, and the arithmetic average roughness Ra of that surface was 8.3 μm.

As a lubricating composition, an aqueous dispersion E similar to that of the above-described Example 10 was used. This aqueous dispersion E was applied by brush coating to one surface of the aforementioned composite sheet member and was allowed to dry, to thereby form an outer layer forming member in which a coating layer (27.7 wt. % of hexagonal boron nitride, 1.3 wt. % of boron oxide, 4.3 wt. % of boehmite, and 66.7 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 27.7 wt. % of hexagonal boron nitride, 1.3 wt. % of boron oxide, 4.3 wt. % of boehmite, and 66.7 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 12

A reinforcing member for the spherical annular base member similar to that of the above-described Example 1 was used. As the heat-resistant material for the spherical annular base member, an expanded graphite sheet similar to that of the above-described Example 8 was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 8 was used. As the reinforcing member for the outer layer, a reinforcing member for the outer layer similar to that of the above-described Example 1 was used. In a method similar to that of the above-described Example 1, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 26.5%, and the arithmetic average roughness Ra of that surface was 19.4 μm.

As a lubricating composition, the aqueous dispersion A (24.9 wt. % of hexagonal boron nitride, 1.2 wt. % of boron oxide, 3.9 wt. % of boehmite, and 70 wt. % of water and nitric acid) used in the above-described Example 1 and the aqueous dispersion B (60 wt. % of PTFE and 40 wt. % of water and a surface active agent) used in the above-described Example 4 were prepared. These aqueous dispersions A and B were mixed at a ratio of A:B=40:60, to thereby prepare an aqueous dispersion F (9.96 wt. % of hexagonal boron nitride, 0.48 wt. % of boron oxide, 1.56 wt. % of boehmite, 36 wt. % of PTFE, and 52 wt. % of water, nitric acid, and a surface active agent) in which 48 wt. % of a lubricating composition containing 20.8 wt. % of hexagonal boron nitride, 1.0 wt. % of boron oxide, 3.2 wt. % of boehmite, and 75 wt. % of PTFE was dispersedly contained as a solid content.

The above-described aqueous dispersion F was applied by brush coating to that surface of the aforementioned composite sheet member which was pressurized by the aforementioned roller having the annular recessed grooves. This aqueous dispersion D was allowed to dry, to thereby form an outer layer forming member in which a coating layer (20.8 wt. % of hexagonal boron nitride, 1.0 wt. % of boron oxide, 3.2 wt. % of boehmite, and 75 wt. % of PTFE) of the solid lubricant constituted of that lubricating composition was formed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 20.8 wt. % of hexagonal boron nitride, 1.0 wt. % of boron oxide, 3.2 wt. % of boehmite, and 75 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 13

A reinforcing member for the spherical annular base member similar to that of the above-described Example 1 was used. As the heat-resistant material for the spherical annular base member, an expanded graphite sheet similar to that of the above-described Example 8 was used. After the heat-resistant material was spirally convoluted by a one-circumference portion, the reinforcing member for the outer layer was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected (jutted out) from the reinforcing member for the spherical annular base member in the widthwise direction.

As the heat-resistant material for the outer layer, an expanded graphite sheet similar to that of the above-described Example 8 was used. As the reinforcing member for the outer layer, a reinforcing member for the outer layer similar to that of the above-described. Example 3 was used. Thereafter, in a method similar to that of the above-described Example 5, a flat composite sheet member was formed in which the surface of the heat-resistant material for the outer layer and the surface of the reinforcing member for the outer layer was made flush with each other, and the surface of that reinforcing member and the surface of that heat-resistant material were exposed. In this composite sheet member, the area ratio of exposure of the surface of the reinforcing member together with the surface of the heat-resistant material on the one surface of the composite sheet member was 20.3%, and the arithmetic average roughness Ra of that surface was 8.3 μm.

As a lubricating composition, an aqueous dispersion F similar to that of the above-described Example 12 was used. This aqueous dispersion F was applied by brush coating to one surface of the aforementioned composite sheet member and was allowed to dry, to thereby form an outer layer forming member in which a coating layer (20.8 wt. % of hexagonal boron nitride, 1.0 wt. % of boron oxide, 3.2 wt. % of boehmite, and 75 wt. % of PTFE) of the solid lubricant constituted of that lubricating composition was foamed on the surface of that composite sheet member.

The above-described outer layer forming member was wound around the outer peripheral surface of the aforementioned tubular base member with the surface of the coating layer placed on the outer side, thereby fabricating the cylindrical preform. Thereafter, through compression forming similar to that of the above-described Example 1, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition containing 20.8 wt. % of hexagonal boron nitride, 1.0 wt. % of boron oxide, 3.2 wt. % of boehmite, and 75 wt. % of PTFE and adherently formed integrally on the base layer at the outer layer intermediate surface consisting of the surface of the heat-resistant material for the outer layer and the surface of the reinforcing member for the outer layer which was flush with the surface of that heat-resistant material.

Example 14

By using an austenitic stainless steel wire (SUS 304) having a wire diameter of 0.28 mm as a fine metal wire, a cylindrical braided metal wire net whose mesh size was 4 mm (vertical) and 5 mm (horizontal) was fabricated and was passed between a pair of rollers to form a belt-shaped metal wire net. The metal wire net thus formed was used as the reinforcing member for the spherical annular base member. As the heat-resistant sheet member for the spherical annular base member, a heat-resistant sheet member containing 0.7 wt. % of phosphorus pentoxide, 4.0 wt. % of aluminum primary phosphate, and expanded graphite and having a density of 1.12 $Mg/m^3$ and a thickness of 0.4 mm was used. After the heat-resistant sheet member was spirally convoluted by a one-circumference portion, the reinforcing member was superposed on the inner side of the heat-resistant sheet member, and the superposed assembly thereof was spirally convoluted, thereby preparing the tubular base member in which the heat-resistant sheet member was located on the outermost periphery. In this tubular base member, widthwise opposite end portions of the heat-resistant sheet member respectively projected from the reinforcing member in the widthwise direction.

As the heat-resistant sheet member for the outer layer, a heat-resistant sheet member containing 0.7 wt. % of phosphorus pentoxide, 4.0 wt. % of aluminum primary phosphate, and expanded graphite and having a density of 0.3 $Mg/m^3$ and a thickness of 1.35 mm was used. As the reinforcing member for the outer layer, by using an austenitic stainless steel wire with a wire diameter of 0.28 mm in the same way as the aforementioned reinforcing member for the spherical annular base member, a cylindrical braided metal wire net whose mesh size was 3.5 mm (vertical) and 2.5 mm (horizontal) was continuously knitted, and the heat-resistant sheet member for the outer layer was continuously inserted into the inner side of that cylindrical braided metal wire net. The reinforcing member with the heat-resistant sheet member inserted therein, starting with its insertion-starting end side of that heat-resistant sheet member, was fed into a nip (the nip Δ1 was set to 0.50 mm) between a cylindrical roller and a roller having a plurality of annular recessed grooves on its outer peripheral surface along the axial direction, and was thereby pressurized. The reinforcing member with the heat-resistant sheet member inserted therein was further fed into a nip (the nip Δ2 was set to 0.45 mm) between another pair of cylindrical rollers and was thereby pressurized. Thus, a flat composite sheet member was formed in which the heat-resistant sheet member for the outer layer and the reinforcing member were press bonded to each other such that the heat-resistant sheet member for the outer layer was densely filled in the meshes of the metal wire net of the reinforcing member, and the reinforcing member was embedded in that heat-resistant sheet member for the outer layer, thereby forming the surface of the heat-resistant sheet member for the outer layer and the surface of the reinforcing member flush with each other and allowing the surface of that reinforcing member and the surface of the heat-resistant sheet member for the outer layer to be exposed. In this composite sheet member, the area ratio of exposure of the surface of the reinforcing member together with the surface of the heat-resistant material on the one surface of the composite sheet member was 26.4%, and the arithmetic average roughness Ra of that surface was 19.3 μm.

As a lubricating composition, an aqueous dispersion (43 wt. % of hexagonal boron nitride, 2 wt. % of boron oxide, 5 wt. % of boehmite, and 50 wt. % of water) was prepared which was an aqueous dispersion formed with a hexagonal boron nitride powder and a boron oxide powder dispersedly contained in an alumina sol in which boehmite (alumina monohydrate: $Al_2O_3 \cdot H_2O$) particles as hydrated alumina were dispersedly contained in water (dispersion medium) containing nitric acid, and which exhibited a hydrogen ion concentration (pH) of 2. In this aqueous dispersion, 50 wt. % of a lubricating composition containing 86 wt. % of hexagonal boron nitride, 4 wt. % of boron oxide, and 10 wt. % of boehmite was dispersedly contained as a solid content.

A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer fanning member was thereby fabricated in which a coating layer (86 wt. % of hexagonal boron nitride, 4 wt. % of boron oxide, and 10 wt. % of boehmite) of the lubricating composition was formed on the one surface of that composite sheet member.

The above-described outer layer forming member was wound around the outer peripheral surface of the aforementioned tubular base member with the surface of the coating layer placed on the outer side, thereby fabricating the cylindrical preform. This cylindrical preform was fitted over the stepped core of the die shown in FIG. 26, and was placed in the hollow portion of the die.

The cylindrical preform disposed in the hollow portion of the die was subjected to compression forming under a pressure of 3 tons/cm² (294 N/mm²) in the direction of the core axis. Thus, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was formed into a smooth surface of the sliding layer constituted of the coating layer of the lubricating composition and adherently formed integrally on the base layer at the outer layer intermediate surface consisting of the surface of the heat-resistant material for the outer layer and the surface of the reinforcing member for the outer layer which was flush with the surface of that heat-resistant material.

Example 15

The tubular base member was fabricated in the same way as in the above-described Example 14. In this tubular base member, widthwise opposite end portions of the heat-resistant sheet member respectively projected from the reinforcing member in the widthwise direction.

As the heat-resistant sheet member for the outer layer, a heat-resistant sheet member similar to that of the above-described Example 14 was used. As the reinforcing member for the outer layer, by using an austenitic stainless steel wire (SUS 304) with a wire diameter of 0.175 mm, a cylindrical braided metal wire net whose mesh size was 3.5 mm (vertical) and 2.5 mm (horizontal) was continuously knitted, and the heat-resistant sheet member for the outer layer was continuously inserted into the inner side of that cylindrical braided metal wire net. The reinforcing member with the heat-resistant sheet member inserted therein, starting with its insertion-starting end side of that heat-resistant sheet member, was fed into a nip (the nip Δ1 was set to 0.50 mm) between the cylindrical roller and the roller having the plurality of annular recessed grooves on its outer peripheral surface along the axial direction, and was thereby pressurized. The reinforcing member with the heat-resistant sheet member inserted therein was further fed into a nip (the nip Δ2 was set to 0.45 mm) between another pair of cylindrical rollers and was thereby pressurized. Thus, a flat composite sheet member was formed in which the heat-resistant sheet member for the outer layer and the reinforcing member were press bonded to each other such that the heat-resistant sheet member for the outer layer was densely filled in the meshes of the metal wire net of the reinforcing member, and the reinforcing member was embedded in that heat-resistant sheet member for the outer layer, thereby forming the surface of the heat-resistant sheet member for the outer layer and the surface of the reinforcing member flush with each other and allowing the surface of that reinforcing member and the surface of the heat-resistant sheet member for the outer layer to be exposed. In this composite sheet member, the area ratio of exposure of the surface of the reinforcing member together with the surface of the heat-resistant material on the one surface of the composite sheet member was 23.7%, and the arithmetic average roughness Ra of that surface was 12.6 µm.

As a lubricating composition, an aqueous dispersion (43 wt. % of hexagonal boron nitride, 2 wt. % of boron oxide, 5 wt. % of boehmite, and 50 wt. % of water), which was similar to that of the above-described Example 14, was used. A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer forming member was thereby fabricated in which a coating layer (86 wt. % of hexagonal boron nitride, 4 wt. % of boron oxide, and 10 wt. % of boehmite) of the lubricating composition was formed on the one surface of that composite sheet member.

Thereafter, in the same way as in the above-described Example 14, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Example 16

The tubular base member was fabricated in the same way as in the above-described Example 14. In this tubular base member, widthwise opposite end portions of the heat-resistant sheet member respectively projected from the reinforcing member in the widthwise direction.

As the heat-resistant sheet member for the outer layer, a heat-resistant sheet member similar to that of the above-described Example 14 was used. As the reinforcing member for the outer layer, by using an austenitic stainless steel wire (SUS 304) with a wire diameter of 0.15 mm, a cylindrical braided metal wire net whose mesh size was 3.5 mm (vertical) and 2.5 mm (horizontal) was continuously knitted, and the heat-resistant sheet member for the outer layer was continuously inserted into the inner side of that cylindrical braided metal wire net. The reinforcing member with the heat-resistant sheet member inserted therein, starting with its insertion-starting end side of that heat-resistant sheet member, was fed into a nip (the nip $\Delta 1$ was set to 0.50 mm) between the cylindrical roller and the roller having the plurality of annular recessed grooves on its outer peripheral surface along the axial direction, and was thereby pressurized. The reinforcing member with the heat-resistant sheet member inserted therein was further fed into a nip (the nip $\Delta 2$ was set to 0.45 mm) between another pair of cylindrical rollers and was thereby pressurized. Thus, a flat composite sheet member was formed in which the heat-resistant sheet member for the outer layer and the reinforcing member were press bonded to each other such that the heat-resistant sheet member for the outer layer was densely filled in the meshes of the metal wire net of the reinforcing member, and the reinforcing member was embedded in that heat-resistant sheet member for the outer layer, thereby forming the surface of the heat-resistant sheet member for the outer layer and the surface of the reinforcing member flush with each other and allowing the surface of that reinforcing member and the surface of the heat-resistant sheet member for the outer layer to be exposed. In this composite sheet member, the area ratio of exposure of the surface of the reinforcing member together with the surface of the heat-resistant material on the one surface of the composite sheet member was 20.4%, and the arithmetic average roughness Ra of that surface was 8.34 µm.

As a lubricating composition, an aqueous dispersion (43 wt. % of hexagonal boron nitride, 2 wt. % of boron oxide, 5 wt. % of boehmite, and 50 wt. % of water), which was similar to that of the above-described Example 14, was used. A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer forming member was thereby fabricated in which a coating layer (86 wt. % of hexagonal boron nitride, 4 wt. % of boron oxide, and 10 wt. % of boehmite) of the lubricating composition was formed on the one surface of that composite sheet member.

Thereafter, in the same way as in the above-described Example 14, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Example 17

The tubular base member was fabricated in the same way as in the above-described Example 14. In this tubular base member, widthwise opposite end portions of the heat-resistant sheet member respectively projected from the reinforcing member in the widthwise direction. In addition, a flat composite sheet member was fabricated by using similar materials and a similar method to those of the above-described Example 14. In this composite sheet member, the area ratio of exposure of the surface of the reinforcing member together with the surface of the heat-resistant material on the one surface of the composite sheet member was 25.64%, and the arithmetic average roughness Ra of that surface was 20.1 µm.

As a lubricating composition, an aqueous dispersion (43 wt. % of hexagonal boron nitride, 2 wt. % of boron oxide, 5 wt. % of boehmite, and 50 wt. % of water) was prepared which was an aqueous dispersion formed with a hexagonal boron nitride powder and a boron oxide powder dispersedly contained in an alumina sol in which boehmite (alumina monohydrate: $Al_2O_3.H_2O$) particles as hydrated alumina were dispersedly contained in water (dispersion medium) containing nitric acid, and which exhibited a hydrogen ion concentration (pH) of 2. In this aqueous dispersion, 50 wt. % of a lubricating composition containing 86 wt. % of hexagonal boron nitride, 4 wt. % of boron nitride, and 10 wt. % of boehmite was dispersedly contained as a solid content. Further, another aqueous dispersion was prepared in which 50 wt. % of a lubricating composition constituted of a PTFE powder was dispersedly contained as a solid content. These aqueous dispersions were mixed to thereby prepare an aqueous dispersion (21.5 wt. % of hexagonal boron nitride, 25 wt. % of PTFE, 1 wt. % of boron oxide, 2.5 wt. % of boehmite, and 50 wt. % of water) in which 50 wt. % of a lubricating composition composed of 43 wt. % of hexagonal boron nitride, 50 wt. % of PTFE, 2 wt. % of boron oxide, and 5 wt. % of boehmite was dispersedly contained as a solid content.

A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer forming member was thereby fabricated in which a coating layer (43 wt. % of hexagonal boron nitride, 50 wt. % of PTFE, 2 wt. % of boron oxide, and 5 wt. % of boehmite) of the lubricating composition was formed on the one surface of that composite sheet member.

Thereafter, in the same way as in the above-described Example 14, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Example 18

The tubular base member was fabricated in the same way as in the above-described Example 14. In this tubular base member, widthwise opposite end portions of the heat-resistant sheet member respectively projected from the reinforcing member in the widthwise direction. In addition, a flat composite sheet member was fabricated by using similar materials and a similar method to those of the above-described Example 15. In this composite sheet member, the area ratio of exposure of the surface of the reinforcing member together with the surface of the heat-resistant material on the one surface of the composite sheet member was 23.6%, and the arithmetic average roughness Ra of that surface was 19.7 µm.

As a lubricating composition, an aqueous dispersion (21.5 wt. % of hexagonal boron nitride, 25 wt. % of PTFE, 1 wt. % of boron oxide, 2.5 wt. % of boehmite, and 50 wt. % of water) similar to that of the above-described Example 17 was used. A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer forming member was thereby fabricated in which a coating layer (43 wt. % of hexagonal boron nitride, 50 wt. % of PTFE, 2 wt. % of boron oxide, and 5 wt. % of boehmite) of the lubricating composition was formed on the one surface of that composite sheet member.

Thereafter, in the same way as in the above-described Example 14, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Example 19

The tubular base member was fabricated in the same way as in the above-described Example 14. In this tubular base member, widthwise opposite end portions of the heat-resistant sheet member respectively projected from the reinforcing member in the widthwise direction. In addition, a flat composite sheet member was fabricated by using similar materials and a similar method to those of the above-described Example 16. In this composite sheet member, the area ratio of exposure of the surface of the reinforcing member together with the surface of the heat-resistant material on the one surface of the composite sheet member was 21.2%, and the arithmetic average roughness Ra of that surface was 10.1 µm.

As a lubricating composition, an aqueous dispersion (21.5 wt. % of hexagonal boron nitride, 25 wt. % of PTFE, 1 wt. % of boron oxide, 2.5 wt. % of boehmite, and 50 wt. % of water) similar to that of the above-described Example 17 was used. A coating operation was repeated three times in which this aqueous dispersion was applied by brush coating to that surface of the aforementioned composite sheet member which was pressurized by the aforementioned roller having the annular recessed grooves and was allowed to dry at a temperature of 100° C. An outer layer forming member was thereby fabricated in which a coating layer (43 wt. % of hexagonal boron nitride, 50 wt. % of PTFE, 2 wt. % of boron oxide, and 5 wt. % of boehmite) of the lubricating composition was formed on the one surface of that composite sheet member.

Thereafter, in the same way as in the above-described Example 14, a spherical annular seal member was obtained which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Comparative Example 1

By using an austenitic stainless steel wire which was similar to that of the above-described Example 1 and had a wire diameter of 0.28 mm as a fine metal wire, a cylindrical braided metal wire net whose mesh size was 4 mm (vertical) and 3 mm (horizontal) was fabricated and was passed between a pair of rollers to form a belt-shaped metal wire net. The metal wire net thus formed was used as the reinforcing member for the spherical annular base member. As the heat-resistant material for the spherical annular base member, an expanded graphite sheet containing 0.7 wt. % of phosphorus pentoxide, 4.0 wt. % of aluminum primary phosphate, and expanded graphite and having a density of 1.12 Mg/m$^3$ and a thickness of 0.4 mm was used. After the heat-resistant material was spirally convoluted by a one-circumference portion, the reinforcing member was superposed on the inner side of the heat-resistant material, and the superposed assembly thereof was spirally convoluted, thereby preparing the tubular base member in which the heat-resistant material was located on the outermost periphery. In this tubular base member, widthwise opposite end portions of the heat-resistant material respectively projected from the reinforcing member in the widthwise direction.

A heat-resistant material similar to the above-described heat-resistant material was separately prepared, and a coating operation was repeated three times in which an aqueous dispersion (25.5 wt. % of hexagonal boron nitride, 4.5 wt. % of alumina, and 70 wt. % of water), in which 30 wt. % of a lubricating composition composed of 85 wt. % of a hexagonal boron nitride powder and 15 wt. % of an alumina powder was dispersedly contained as a solid content, was applied by brush coating to one surface of that composite sheet member and was allowed to dry at a temperature of 100° C. A coating layer (85 wt. % of hexagonal boron nitride and 15 wt. % of alumina) of the lubricating composition was formed on the one surface of that heat-resistant material.

After forming a cylindrical braided metal wire net whose mesh size was 3.5 mm (vertical) and 2.5 mm (horizontal) by using an austenitic stainless steel wire (SUS 304) with a wire diameter of 0.28 mm, a belt-shaped metal wire net fabricated by the cylindrical braided metal wire net between rollers was prepared. The heat-resistant material having the aforementioned coating layer was inserted into that belt-shaped metal wire net, and an assembly thereof was passed between rollers so as to be formed integrally, thereby fabricating a composite sheet member in which the lubricating composition and the metal wire net were present on its one surface in mixed form.

In this composite sheet member, the area ratio of exposure of the surface of the reinforcing member together with the surface of the heat-resistant material on the one surface of the composite sheet member was 43.42%, and the arithmetic average roughness Ra of that surface was 71.3 μm.

This composite sheet member, with its surface where the coating layer of the lubricating composition and the metal wire net were present in mixed form placed on the outer side, was wound around the outer peripheral surface of the aforementioned tubular base member, thereby fabricating the cylindrical preform. Subsequently, this cylindrical preform was subjected to compression forming in a method similar to that of the above-described Example 1, thereby obtaining a spherical annular seal member which was comprised of the spherical annular base member having the through hole in its central portion and defined by the cylindrical inner surface, the partially convex spherical surface, and the large- and small-diameter-side annular end faces of the partially convex spherical surface, as well as the outer layer formed integrally on the partially convex spherical surface of the spherical annular base member.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was constituted of a smooth surface of the sliding layer in which the reinforcing member and the lubricating composition of the coating layer were present in mixed form.

Comparative Example 2

The tubular base member was fabricated by using similar materials and a similar method to those the above-described Comparative Example 1. In this tubular base member, widthwise opposite end portions of the heat-resistant sheet member respectively projected from the reinforcing member in the widthwise direction.

A heat-resistant material similar to that of the above-described Comparative Example 1 was separately prepared, and a coating operation was repeated three times in which an aqueous dispersion (10.2 wt. % of hexagonal boron nitride, 18 wt. % of PTFE, 1.8 wt. % of alumina, and 70 wt. % of water), in which a lubricating composition composed of 85 wt. % of a hexagonal boron nitride powder and 15 wt. % of an alumina powder was set as 100 parts by weight, and 30 wt. % of a lubricating composition (34 wt. % of hexagonal boron nitride, 60 wt. % of PTFE, and 6 wt. % of alumina) dispersely containing 150 parts by weight of a PTFE powder was dispersedly contained therein as a solid content, was applied by brush coating to one surface of that heat-resistant material and was allowed to dry at a temperature of 100° C. A coating layer (34 wt. % of hexagonal boron nitride, 60 wt. % of PTFE, and 6 wt. % of alumina) of the lubricating composition was formed on the one surface of that heat-resistant sheet member.

After forming a cylindrical braided metal wire net whose mesh size was 3.5 mm (vertical) and 2.5 mm (horizontal) by using an austenitic stainless steel wire (SUS 304) with a wire diameter of 0.28 mm, a belt-shaped metal wire net fabricated by the cylindrical braided metal wire net between rollers was prepared. The heat-resistant material having the aforementioned coating layer was inserted into that belt-shaped metal wire net, and an assembly thereof was passed between rollers so as to be formed integrally, thereby fabricating a composite sheet member in which the lubricating composition and the metal wire net were present on its one surface in mixed form.

In this composite sheet member, the area ratio of exposure of the surface of the reinforcing member together with the surface of the heat-resistant material on the one surface of the composite sheet member was 45.2%, and the arithmetic average roughness Ra of that surface was 72.6 μm.

Thereafter, a spherical annular seal member was obtained by compression forming similar to that of the above-described Comparative Example 1.

Through this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member thus had the reinforcing member for the spherical annular base member made from the compressed metal wire net as well as the heat-resistant material for the spherical annular base member which was constituted of expanded graphite and which filled the meshes of this reinforcing member and was compressed in such a manner as to be formed integrally with this reinforcing member in mixed form. The obverse surface of the outer layer was constituted of a smooth surface of the sliding layer in which the heat-resistant material, the reinforcing member, and the lubricating composition were present in mixed form.

Next, the spherical annular seal members obtained in the above-described Examples 1 to 13 and Comparative Examples 1 and 2 were built in the exhaust pipe spherical joint shown in FIG. 33, and the change in surface roughness of the surface of the mating member, the presence or absence of generation of frictional noise, and the amount of gas leakage (1/min) were tested by a hot shearing input endurance test. Their results are discussed below.

<Test Conditions of Hot Shear Input Endurance Test>
    Temperature (surface temperature of the flared portion 203 shown in FIG. 33): 300° C.
    Angle of oscillation: ±0.5°
    Vibrational frequency: 25 Hz
    Vibration time: 120 Hr
    Inertial force: weight of 29.4 N
    Pressing force using coil springs: 588 N (spring set force)
    Mating member (material of the flared portion 203 shown in FIG. 33): SUS 304

Surface roughness of the mating member surface: ten-point average roughness (Rz JIS)

<Test Method>

One exhaust pipe 100 of the exhaust pipe spherical joint shown in FIG. 33 was fixed, and high-temperature gas was circulated into that exhaust pipe 100 to increase the surface temperature of the mating member (flared portion 203 shown in FIG. 33) to 300° C. At the point of time when the surface temperature of the mating member reached 300° C., a weight was affixed to the outer peripheral surface of the other exhaust pipe 200, and the exhaust pipe 200 was subjected to oscillating motion ±0.5° for 120 Hr at a vibrational frequency of 25 Hz, whereupon the surface roughness of the mating member was measured by the ten-point average roughness (Rz JIS).

<Test Conditions Concerning Gas Leakage Amount>

Pressing force using coil springs (spring set force): 980 N
Angle of oscillation: ±2.5°
Vibrational frequency (oscillating speed): 5 Hz
Temperature (the outer surface temperature of the concave spherical surface portion 201 shown in FIG. 33): room temperature (25° C.) to 500° C.
No. of oscillations: 1,000,000 oscillations
Mating member (material of the flared portion 203 shown in FIG. 33): SUS 304

<Test Method>

While the oscillating motion at ±2.5° was being continued at a vibrational frequency of 5 Hz at room temperature, the temperature was raised to 500° C. The oscillating motion was continued in a state in which that temperature was maintained, and the amount of gas leakage was measured at the point of time when the number of oscillations reached 1,000,000.

<Method of Measuring Gas Leakage Amount>

An opening of one exhaust pipe 100 on the upstream side of the exhaust pipe spherical joint shown in FIG. 33 was closed, dry air was allowed to flow in from the other downstream exhaust pipe 200 side under a pressure of 0.049 MPa (0.5 kgf/cm$^2$), and the amount of leakage from joint portions (sliding contact portions between the surface 45 of the spherical annular seal member 39 and the flared portion 203, fitting portions between the cylindrical inner surface 33 of the spherical annular seal member 39 and the pipe end portion 101 of the upstream exhaust pipe 100, and abutting portions between the annular end face 35 and the flange 102 provided uprightly on the upstream exhaust pipe 100) was measured four times, i.e., (1) during an initial period of the test (before starting), (2) after 250,000 oscillating motions, (3) after 500,000 oscillating motions, and (4) after 500,000 oscillating motions, by means of a flowmeter.

<Test Method Concerning Presence or Absence of Abnormal Frictional Noise>

Pressing force using coil springs (spring set force): 590 N
Angle of oscillation: ±4°
Vibrational frequency: 12 Hz
Temperature (the outer surface temperature of the concave spherical surface portion 302 shown in FIG. 33): room temperature (25° C.) to 500° C.
No. of tests: 1,000,000 cycles
Mating member (material of the flared portion 203 shown in FIG. 33): SUS 304

<Test Method>

After 45,000 oscillating motions are performed at room temperature (25° C.) by setting an oscillating motion at ±4° at a vibrational frequency of 12 Hz as a unit of oscillation, the ambient temperature (the outer surface temperature of the concave spherical surface portion 302 shown in FIG. 33) is raised to 500° C. while continuing the oscillating motions (the number of oscillating motions during the temperature rise being 45,000). When the ambient temperature reached 500° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

The evaluation of the presence or absence of the generation of abnormal frictional noise was conducted at the aforementioned points in time, i.e., (1) 250,000 oscillating motions, (2) 500,000 oscillating motions, (3) 750,000 oscillating motions, and (4) 1,000,000 oscillating motions, as follows.

Evaluation Code A: No abnormal frictional noise occurred.

Evaluation Code B: Abnormal frictional noise is slightly heard with the ear brought close to the test piece.

Evaluation Code C: Although the noise is generally difficult to discern from a fixed position (a position 1.5 in distant from the test piece) since it is blanketed by the noises of the living environment, the noise can be discerned as abnormal frictional noise by a person engaged in the test.

Evaluation Code D: The noise can be recognized as abnormal frictional noise (unpleasant sound) by anybody from the fixed position.

Tables 1 to 4 show the results of the above-described tests.

TABLE 1

| | Examples | | | | |
|---|---|---|---|---|---|
| | 1 | 2 | 3 | 4 | 5 |
| Reinforcing Member for Outer Layer (Dia.: mm) | 0.28 | 0.175 | 0.15 | 0.28 | 0.15 |
| <Heat-resistant Material (Expanded graphite)> | | | | | |
| Aluminum primary phosphate | — | — | — | — | — |
| Phosphorus pentoxide | — | — | — | — | — |
| <Coating Layer of Solid Lubricant> | | | | | |
| Hexagonal boron nitride | 83 | 83 | 83 | — | — |
| Boron oxide | 4 | 4 | 4 | — | — |
| Hydrated alumina | 13 | 13 | 13 | — | — |
| PTFE | — | — | — | 100 | 100 |
| Surface Roughness of Mating Member (Rz JIS) | | | | | |
| Before test start | 10 | 10 | 10 | 10 | 10 |
| After test | 22 | 18 | 15 | 24 | 16 |
| Amount of Gas Leakage (l/min) | | | | | |
| (1) | 0.08 | 0.08 | 0.08 | 0.08 | 0.08 |
| (2) | 0.15 | 0.13 | 0.12 | 0.18 | 0.20 |
| (3) | 0.24 | 0.18 | 0.16 | 0.28 | 0.31 |
| (4) | 0.30 | 0.24 | 0.22 | 0.40 | 0.42 |
| Determination of Abnormal Frictional Noise | | | | | |
| (1) | A | A | A | A | A |
| (2) | A | A | A | A | A |
| (3) | A | A | A | A | A |
| (4) | A-B | A-B | A-B | A-B | A-B |

TABLE 2

| | Examples | | | | |
|---|---|---|---|---|---|
| | 6 | 7 | 8 | 9 | 10 |
| Reinforcing Member for Outer Layer (Dia.: mm) <Heat-resistant Material (Expanded graphite)> | 0.28 | 0.15 | 0.28 | 0.15 | 0.28 |
| Aluminum primary phosphate | 4.0 | 4.0 | 4.0 | 4.0 | 4.0 |
| Phosphorus pentoxide <Coating Layer of Solid Lubricant> | — | — | 0.7 | 0.7 | 0.7 |
| Hexagonal boron nitride | 44.7 | 44.7 | 40.4 | 40.4 | 27.7 |
| Boron oxide | 2.1 | 2.1 | 2 | 2 | 1.3 |
| Hydrated alumina | 7 | 7 | 6.2 | 6.2 | 4.3 |
| PTFE | 46.2 | 46.2 | 51.4 | 51.4 | 66.7 |
| Surface Roughness of Mating Member (Rz JIS) | | | | | |
| Before test start | 10 | 10 | 10 | 10 | 10 |
| After test | 23 | 15 | 22 | 16 | 25 |
| Amount of Gas Leakage (l/min) | | | | | |
| (1) | 0.08 | 0.08 | 0.08 | 0.08 | 0.08 |
| (2) | 0.14 | 0.13 | 0.16 | 0.14 | 0.14 |
| (3) | 0.20 | 0.16 | 0.22 | 0.16 | 0.23 |
| (4) | 0.30 | 0.20 | 0.32 | 0.22 | 0.30 |
| Determination of Abnormal Frictional Noise | | | | | |
| (1) | A | A | A | A | A |
| (2) | A | A | A | A | A |
| (3) | A | A | A | A | A |
| (4) | A | A | A | A | A |

TABLE 3

| | Examples | | | | |
|---|---|---|---|---|---|
| | 11 | 12 | 13 | 14 | 15 |
| Reinforcing Member for Outer Layer (Dia.: mm) <Heat-resistant Material (Expanded graphite)> | 0.15 | 0.28 | 0.15 | 0.28 | 0.175 |
| Aluminum primary phosphate | 4.0 | 4.0 | 4.0 | 4.0 | 4.0 |
| Phosphorus pentoxide <Coating Layer of Solid Lubricant> | 0.7 | 0.7 | 0.7 | 0.7 | 0.7 |
| Hexagonal boron nitride | 27.7 | 20.8 | 20.8 | 86 | 86 |
| Boron oxide | 1.3 | 1.0 | 1.0 | 4 | 4 |
| Hydrated alumina | 4.3 | 3.2 | 3.2 | 10 | 10 |
| PTFE | 66.7 | 75 | 75 | — | — |
| Surface Roughness of Mating Member (Rz JIS) | | | | | |
| Before test start | 10 | 10 | 10 | Not measured | Not measured |
| After test | 16 | 24 | 18 | | |
| Amount of Gas Leakage (l/min) | | | | | |
| (1) | 0.08 | 0.08 | 0.08 | 0.08 | 0.08 |
| (2) | 0.12 | 0.16 | 0.14 | 0.15 | 0.10 |
| (3) | 0.16 | 0.25 | 0.16 | 0.24 | 0.14 |
| (4) | 0.22 | 0.32 | 0.24 | 0.30 | 0.20 |
| Determination of Abnormal Frictional Noise | | | | | |
| (1) | A | A | A | A | A |
| (2) | A | A | A | A | A |
| (3) | A | A | A | A | A |
| (4) | A | A | A | A-B | A-B |

TABLE 4

| | Examples | | | | Comparative Examples | |
|---|---|---|---|---|---|---|
| | 16 | 17 | 18 | 19 | 1 | 2 |
| Reinforcing Member for Outer Layer (Dia.: mm) <Heat-resistant Material (Expanded graphite)> | 0.15 | 0.28 | 0.175 | 0.15 | 0.28 | 0.28 |
| Aluminum primary phosphate | 4.0 | 4.0 | 4.0 | 4.0 | 4.0 | 4.0 |
| Phosphorus pentoxide <Coating Layer of Solid Lubricant> | 0.7 | 0.7 | 0.7 | 0.7 | 0.7 | 0.7 |
| Hexagonal boron nitride | 86 | 43 | 43 | 43 | 85 | 34 |
| Boron oxide | 4 | 2 | 2 | 2 | — | — |
| Hydrated alumina | 10 | 5 | 5 | 5 | — | — |
| PTFE | — | 50 | 50 | 50 | — | 60 |
| Alumna | — | — | — | — | 15 | 6 |
| Surface Roughness of Mating Member (Rz JIS) | | | | | | |
| Before test start | Not measured | Not measured | Not measured | Not measured | 10 | 10 |
| After test | | | | | 35 | 37 |
| Amount of Gas Leakage (l/min) | | | | | | |
| (1) | 0.09 | 0.08 | 0.08 | 0.08 | 0.09 | 0.08 |
| (2) | 0.18 | 0.20 | 0.12 | 0.10 | 0.41 | 0.35 |
| (3) | 0.28 | 0.31 | 0.22 | 0.16 | 0.72 | 0.64 |
| (4) | 0.40 | 0.40 | 0.30 | 0.20 | 1.92 | 1.80 |

TABLE 4-continued

|  | Examples | | | | Comparative Examples | |
| --- | --- | --- | --- | --- | --- | --- |
|  | 16 | 17 | 18 | 19 | 1 | 2 |
| Determination of Abnormal Frictional Noise | | | | | | |
| (1) | A | A | A | A | A | A |
| (2) | A | A | A | A | A | A |
| (3) | A | A | A | A | B | A-B |
| (4) | A-B | A | A | A | B | B |

From the test results shown in Tables 1 to 4, it can be appreciated that the spherical annular seal members in accordance with Examples 1 to 13 excel over the spherical annular seal members in accordance with Comparative Examples 1 and 2 in the evaluation of the coarsening of the surface of the mating member, the amount of gas leakage, and abnormal frictional noise. In addition, although, in the spherical annular seal members in accordance with Examples 14 to 19, the surface roughness of the mating member after the test was not measured, the evaluations of the amount of gas leakage and abnormal frictional noise were by no means inferior to those of the spherical annular seal members in accordance with Examples 1 to 13, so that it can be conjectured that it was possible to prevent the coarsening of the surface of the mating member after the test as much as possible. Meanwhile, in the spherical annular seal members in accordance with Comparative Examples 1 and 2, since the structure was such that the reinforcing member for the outer layer was exposed on the surface of the outer layer in sliding contact with the surface of the mating member, it is conjectured that this reinforcing member for the outer layer attacked the surface of the mating member and coarsened it in the friction with the mating member, causing an increase in the amount of gas leakage from the frictional surfaces between the outer layer surface of the spherical annular seal member and the mating member surface, i.e., from the sealing surface.

As described above, the surface of the outer layer is constituted of the smooth surface of the sliding layer of the lubricating composition which is integrally adhered to the outer layer intermediate surface of the base layer consisting of the surface of the heat-resistant material for the outer layer and the reinforcing member for the outer layer made flush with the surface of that heat-resistant material as the heat-resistant material for the outer layer and the reinforcing member for the outer layer are press bonded to each other such that the reinforcing member for the outer layer is embedded in the heat-resistant material for the outer layer. Therefore, it is possible to prevent the damaging and coarsening of the surface of the mating member as much as possible in the friction with the mating member, thereby making it possible to prevent a decline in sealability and the generation of abnormal frictional noise.

In addition, in the method of manufacturing a spherical annular seal member in accordance with the invention, the heat-resistant material for the outer layer constituted of expanded graphite having a lower density than the density of the expanded graphite forming the heat-resistant material for the spherical annular base member is inserted into two layers of the reinforcing member for the outer layer made from the metal wire net, and the reinforcing member for the outer layer with such a heat-resistant material for the outer layer inserted therein is pressurized in the thicknesswise direction of that heat-resistant material and is thereby press bonded to each other, such that the heat-resistant material for the outer layer is densely filled in the meshes of the metal wire net of the reinforcing member for the outer layer, and the reinforcing member for the outer layer is embedded in the heat-resistant material for the outer layer. It is thereby possible to form a flat composite sheet member in which the surface of the heat-resistant material for the outer layer and the surface of the reinforcing member for the outer layer are made flush with each other, and the reinforcing member for the outer layer in the surface of the reinforcing member of that outer layer and the surface of the heat-resistant sheet member for the outer layer, which are made flush with each other, is exposed in a scattered manner with an area ratio of 5 to 35%. In the outer layer formed by this composite sheet member, even in the case where the composite sheet member is integrally formed with the partially convex spherical surface of the spherical annular base member, the reinforcing member is present in a scattered manner in its outer layer intermediate surface with the area ratio of 5 to 35%. Therefore, in the friction with the mating member, it is possible to avoid only the reinforcing member of the outer layer from locally rubbing against the surface of the mating member. As a result, it is possible to prevent damaging and coarsening the surface of the mating member as much as possible due to friction, so that it is possible to prevent a decline in sealability. In addition, by virtue of the action of scraping an excess lubricating film formed on the surface of the mating member, the friction is made that of friction via the lubricating film of an appropriate thickness formed on the surface of the mating member. Hence, it is possible to prevent the generation of abnormal frictional noise as much as possible.

The invention claimed is:

1. A spherical annular seal member for use in an exhaust pipe joint comprising: a spherical annular base member defined by a cylindrical inner surface, a partially convex spherical surface, and large- and small-diameter-side annular end faces of the partially convex spherical surface; and an outer layer formed integrally on the partially convex spherical surface of said spherical annular base member,
wherein said spherical annular base member includes a reinforcing member made from a metal wire net and a heat-resistant material containing expanded graphite, filling meshes of said metal wire net of said reinforcing member, and compressed in such a manner as to be formed integrally with said reinforcing member in mixed form, and
wherein said outer layer includes a base layer and a sliding layer constituted of a lubricating composition and adherently formed integrally on said base layer at an outer layer intermediate surface, said base layer including another reinforcing member made from a metal wire net and compressed and another heat-resistant material containing another expanded graphite, filling meshes of said metal wire net of said another reinforcing member, compressed so as to be closely press bonded to said another reinforcing member, and forming the outer layer intermediate surface together with a surface of said another reinforcing member, said base layer being formed integrally with the partially convex spherical surface, the surface of said another reinforcing member in the outer layer intermediate surface being present in a scattered manner with an area ratio of 5 to 35% with respect an entire surface of the outer layer intermediate surface, an obverse surface of said outer layer exposed to an outside being constituted of a smooth surface of said sliding layer.

2. The spherical annular seal member according to claim 1, wherein said heat-resistant materials of said spherical annular base member and said outer layer contain expanded graphite and at least one of 0.05 to 5.00 wt. % of phosphorus pentoxide and 1.0 to 16.0 wt. % of a phosphate.

3. The spherical annular seal member according to claim 1, wherein said lubricating composition is composed of a polytetrafluoroethylene resin.

4. The spherical annular seal member according to claim 1, wherein said lubricating composition contains 70 to 85 wt. % of hexagonal boron nitride, 0.1 to 10 wt. % of boron oxide, and 5 to 20 wt. % of hydrated alumina.

5. The spherical annular seal member according to claim 4, wherein hydrated alumina is selected from alumina monohydrate such as boehmite or diaspore, alumina trihydrate such as gibbsite or bayerite, and pseudoboehmite.

6. The spherical annular seal member according to claim 1, wherein, in a lubricating component containing 70 to 85 wt. % of hexagonal boron nitride, 0.1 to 10 wt. % of boron oxide, and 5 to 20 wt. % of hydrated alumina, said lubricating composition contains the polytetrafluoroethylene resin at a rate of not more than 300 parts by weight or not more than 200 parts by weight with respect to 100 parts by weight of said lubricating component.

7. The spherical annular seal member according to claim 1, wherein, in a lubricating component containing 70 to 85 wt. % of hexagonal boron nitride, 0.1 to 10 wt. % of boron oxide, and 5 to 20 wt. % of hydrated alumina, said lubricating composition contains the polytetrafluoroethylene resin at a rate of 50 to 200 parts by weight or 50 to 150 parts by weight with respect to 100 parts by weight of said lubricating component.

8. A method of manufacturing a spherical annular seal member which is used in an exhaust pipe joint and includes a spherical annular base member defined by a cylindrical inner surface, a partially convex spherical surface, and large- and small-diameter-side annular end faces of the partially convex spherical surface, and an outer layer formed integrally on the partially convex spherical surface of said spherical annular base member, comprising the steps of:
(a) preparing a heat-resistant material for the spherical annular base member constituted of an expanded graphite sheet with a density of $\alpha$ Mg/m$^3$;
(b) preparing a reinforcing member for the spherical annular base member made from a metal wire net obtained by weaving or knitting fine metal wires, superposing said reinforcing member for the spherical annular base member on said heat-resistant material for the spherical annular base member to form a superposed assembly, and convoluting the superposed assembly into a cylindrical form, so as to form a tubular base member;
(c) inserting a heat-resistant material for the outer layer constituted of an expanded graphite sheet with a density of $0.3\alpha$ to $0.6\alpha$ Mg/m$^3$ into two layers of a reinforcing member for the outer layer made from a metal wire net obtained by weaving or knitting fine metal wires, and pressurizing in a thicknesswise direction of said heat-resistant material said reinforcing member for the outer layer with said heat-resistant material for the outer layer inserted therein, to cause said heat-resistant material for the outer layer and said reinforcing member for the outer layer to be press bonded to each other such that said heat-resistant material for the outer layer is densely filled in meshes of said metal wire net of said reinforcing member for the outer layer, and said reinforcing member for the outer layer is embedded in said heat-resistant material for the outer layer, thereby forming a flat composite sheet member in which a surface of the heat-resistant material for the outer layer and said reinforcing member for the outer layer are made flush with each other, and said reinforcing member for the outer layer in a surface of said reinforcing member for the outer layer and the surface of said heat-resistant material for the outer layer is exposed in a scattered manner with an area ratio of 5 to 35%;
(d) coating a surface of said composite sheet member where the surface of said heat-resistant sheet member for the outer layer and the surface of said reinforcing member for the outer layer are made flush with each other with a lubricating composition so as to form an outer layer forming member in which a coating layer of said lubricating composition is formed on that surface;
(e) winding said outer layer forming member around an outer peripheral surface of said tubular base member with said coating layer placed on an outer side, so as to form a cylindrical preform; and
(f) fitting said cylindrical preform over an outer peripheral surface of a core of a die, placing said core into said die, and compression-forming said cylindrical preform in said die in an axial direction of said core,
wherein said spherical annular base member is formed such that said heat-resistant material for the spherical annular base member constituted of expanded graphite and said reinforcing member for the spherical annular base member made from said metal wire net are compressed and intertwined with each other so as to be provided with structural integrity, and
wherein said outer layer includes a base layer and a sliding layer constituted of a lubricating composition and adherently formed integrally on said base layer at an outer layer intermediate surface, said base layer including said reinforcing member for the outer layer made from said metal wire net and compressed and said heat-resistant material for the outer layer constituted of expanded graphite, filling meshes of said metal wire net of said reinforcing member for the outer layer, compressed so as to be closely press bonded to said reinforcing member for the outer layer, and forming an outer layer intermediate surface together with the surface of said reinforcing member for the outer layer, said base layer being formed integrally with the partially convex spherical surface, the surface of said reinforcing member for the outer layer in the outer layer intermediate surface being present in a scattered manner with an area ratio of 5 to 35% in the outer layer intermediate surface, an obverse surface of said outer layer exposed to an outside being constituted of a smooth surface of said sliding layer.

9. The method of manufacturing a spherical annular seal member according to claim 8, wherein the pressurization, in the thicknesswise direction of said heat-resistant material, of said reinforcing member for the outer layer with said heat-resistant material for the outer layer inserted therein is effected by feeding the same into a nip between a cylindrical roller having a smooth outer peripheral surface and a roller having a cylindrical outer peripheral surface with a plurality of annular recessed grooves provided along the axial direction, and subsequently by further feeding the same into a nip between a pair of cylindrical rollers each having a smooth cylindrical outer peripheral surface.

10. The method of manufacturing a spherical annular seal member according to claim 9, wherein the surface of said composite sheet member which is coated with the lubricating composition and where the surface of said heat-resistant sheet member for the outer layer and the surface of said reinforcing member for the outer layer are made flush with each other is a surface of said composite sheet member on a side pressurized by the cylindrical roller having the annular recessed grooves.

11. The method of manufacturing a spherical annular seal member according to claim 8, wherein the pressurization, in the thicknesswise direction of said heat-resistant material, of said reinforcing member for the outer layer with said heat-resistant material for the outer layer inserted therein is effected by feeding the same into a nip between at least a pair of cylindrical rollers each having a smooth cylindrical outer peripheral surface.

12. The method of manufacturing a spherical annular seal member according to claim 8, wherein the density α of said heat-resistant material for the spherical annular base member is 1.0 to 1.5 $Mg/m^3$.

13. The method of manufacturing a spherical annular seal member according to claim 8, wherein the surface roughness of said composite sheet member is 5 to 30 μm in an arithmetic average roughness Ra.

14. The method of manufacturing a spherical annular seal member according to claim 8, wherein said heat-resistant materials of said spherical annular base member and said outer layer contain expanded graphite and at least one of 0.05 to 5.00 wt. % of phosphorus pentoxide and 1.0 to 16.0 wt. % of a phosphate.

15. The method of manufacturing a spherical annular seal member according to claim 8, wherein said lubricating composition which is coated on one surface of said composite sheet member is an aqueous dispersion containing a polytetrafluoroethylene resin.

16. The method of manufacturing a spherical annular seal member according to claim 8, wherein said lubricating composition which is coated on one surface of said composite sheet member is an aqueous dispersion in which a hexagonal boron nitride powder and a boron oxide powder are dispersedly contained in an alumina sol in which hydrated alumina particles are dispersedly contained in water containing an acid as a dispersion medium, and which exhibits a hydrogen ion concentration of 2 to 3, the aqueous dispersion containing as a solid content 70 to 85 wt. % of hexagonal boron nitride, 0.1 to 10 wt. % of boron oxide, and 5 to 20 wt. % of hydrated alumina.

17. The method of manufacturing a spherical annular seal member according to claim 16, wherein the acid which is contained in the water as the dispersion medium is nitric acid.

18. The method of manufacturing a spherical annular seal member according to claim 16, wherein hydrated alumina is selected from alumina monohydrate such as boehmite or diaspore, alumina trihydrate such as gibbsite or bayerite, and pseudoboehmite.

19. The method of manufacturing a spherical annular seal member according to claim 8, wherein said lubricating composition which is coated on one surface of said composite sheet member is an aqueous dispersion in which a hexagonal boron nitride powder and a boron oxide powder are dispersedly contained in an alumina sol in which hydrated alumina particles are dispersedly contained in water containing an acid as a dispersion medium, and which exhibits a hydrogen ion concentration of 2 to 3, the aqueous dispersion being one in which, in a lubricating composition component composed of 70 to 85 wt. % of hexagonal boron nitride, 0.1 to 10 wt. % of boron oxide, and 5 to 20 wt. % of hydrated alumina, a polytetrafluoroethylene resin is contained by not more than 300 parts by weight or not more than 200 parts by weight with respect to 100 parts by weight of that lubricating composition component.

20. The method of manufacturing a spherical annular seal member according to claim 8, wherein said lubricating composition which is coated on one surface of said composite sheet member is an aqueous dispersion in which a hexagonal boron nitride powder and a boron oxide powder are dispersedly contained in an alumina sol in which hydrated alumina particles are dispersedly contained in water containing an acid as a dispersion medium, and which exhibits a hydrogen ion concentration of 2 to 3, the aqueous dispersion being one in which, in a lubricating composition component composed of 70 to 85 wt. % of hexagonal boron nitride, 0.1 to 10 wt. % of boron oxide, and 5 to 20 wt. % of hydrated alumina, a polytetrafluoroethylene resin is contained by 50 to 200 parts by weight or 50 to 150 parts by weight with respect to 100 parts by weight of that lubricating composition component.

21. The method of manufacturing a spherical annular seal member according to claim 8, wherein the density of said heat-resistant sheet member for the outer layer is 0.3 to 0.9 $Mg/m^3$.

* * * * *

UNITED STATES PATENT AND TRADEMARK OFFICE
CERTIFICATE OF CORRECTION

PATENT NO.        : 8,567,793 B2                                        Page 1 of 1
APPLICATION NO.   : 12/808226
DATED             : October 29, 2013
INVENTOR(S)       : Shuichi Kubota et al.

It is certified that error appears in the above-identified patent and that said Letters Patent is hereby corrected as shown below:

On the Title page item (75), the third named inventor's name should read:

Satoshi Matsunaga

Signed and Sealed this
Eighteenth Day of February, 2014

Michelle K. Lee
*Deputy Director of the United States Patent and Trademark Office*